United States Patent [19]

Schirmer et al.

[11] Patent Number: 4,488,866
[45] Date of Patent: Dec. 18, 1984

[54] METHOD AND APPARATUS FOR BURNING HIGH NITROGEN-HIGH SULFUR FUELS

[75] Inventors: Robert M. Schirmer, Bartlesville, Okla.; Henry E. Alquist, Savannah, Ga.

[73] Assignee: Phillips Petroleum Company, Bartlesville, Okla.

[21] Appl. No.: 404,682

[22] Filed: Aug. 3, 1982

[51] Int. Cl.³ .................................................. F23J 5/00
[52] U.S. Cl. ........................................... 431/4; 431/2; 208/208 R; 110/342
[58] Field of Search ............... 431/2, 4; 208/208 R; 110/342

[56] References Cited

U.S. PATENT DOCUMENTS 4,041,699  8/1977  Schelp .............................. 60/39.55
4,049,021  9/1977  Fromm et al. ..................... 431/188

OTHER PUBLICATIONS

"Coal Desulfurization Prior to Combustion", Robert C. Eliot, Noyes Data Corporation, Park Ridge, New Jersey, U.S.A., 1978; pp. 43, 141, 142, 180, 191-193.

Primary Examiner—Carroll B. Dority, Jr.

[57] ABSTRACT

A method of minimizing the production of $SO_x$ and $NO_x$ in the burning of a fuel containing significant amounts of $SO_x$ and $NO_x$ precursors in which the fuel is treated to remove significant amounts of $SO_x$ precursors without the removal of significant amounts of $NO_x$ precursors and the fuel is thereafter burned in a two-stage, rich-lean burning step in which significant amounts of the $NO_x$ precursors are converted to $N_2$. Treating the fuel to remove $SO_x$ precursors is preferably carried out in the presence of an oxidizing agent, such as $H_2O_2$, a reducing agent, such as hydrogen, and/or steam, and still more preferably, the oxidizing agent, the reducing agent and steam are generated by burning an auxiliary fuel and passing the effluent thereof to the step of treating the fuel to remove $SO_x$ precursors.

33 Claims, 14 Drawing Figures

COMBUSTOR C

COMBUSTORS C & D

COMBUSTOR E

METHOD AND APPARATUS FOR BURNING HIGH NITROGEN-HIGH SULFUR FUELS

BACKGROUND OF THE INVENTION

The present invention relates to a method and apparatus for burning high sulfur-high nitrogen fuels while reducing $SO_x$ and $NO_x$ pollutants.

A major problem which has arisen in the United States and other highly industrialized countries of the world is air pollution from exhaust gases from large stationary installations, such as boilers in power plants, large stationary gas turbines employed as a driving force in power plants and other large installations, as well as process heaters in refineries and other chemical operations. It is anticipated that this problem will almost certainly be aggravated in the relatively near future by the necessity of using lower quality fuels, such as fuels derived from heavy petroleum oils, shale oils, coal liquids, etc., as well as the direct combustion of solid fuels such as coals, lignites, etc. Such fuels contain relatively large amounts of fuel-nitrogen, e.g., up to about 2.5 percent or higher, as compared with presently available petroleum derived fuels containing very little, if any, fuel-nitrogen. For example, No. 4 and No. 6 petroleum oils contain about 0.1 to 0.5 wt. percent nitrogen. Thus, any crude oil containing less than about 0.5 percent nitrogen is considered a low nitrogen oil and the production of $NO_x$ pollutants in the flue gases from the burning of such oils is of little significance. However, heavy petroleum oils, crude shale oils and the like contain up to about 2.5 wt. percent or higher of chemically bound nitrogen and a typical crude solvent refined coal oil contains from about 1.0 to 1.5 wt. percent of chemically bound nitrogen, while a typical solid fuel, such as coal, lignite, etc., contains an average of about 1.4 wt. percent nitrogen. If all of the chemically bound nitrogen in the fuel is converted to nitrogen oxides, generally referred to as "fuel $NO_x$", 1 percent by wt. of nitrogen in a solvent refined coal oil has the potential of producing about 1.928 lbs/MM BTU or 1,300 PPMV (parts per million by volume at 3 percent excess oxygen, dry) of nitrogen oxides ($NO_x$), while 1.85 and 1.93 percent by wt. of nitrogen in crude shale oils will potentially produce about 3.288 and 3.440 lbs/MM BTU (2,595 and 2,642 PPMV), respectively. In addition, nitrogen oxides produced by the "hot-air reactions" at flame temperatures, and referred to as "thermal $NO_x$" also contribute to total $NO_x$ pollutants in the flue gases from combustion processes.

The federal limit for the discharge of $NO_x$ pollutants into the atmosphere from steam generators burning liquid fossil fuels (1974 EPA New Source Performance Standards [NSPS]) is 0.3 lbs/MM BTU (about 230 to 237 PPMV for typical shale oils). Some state limitations are even more stringent, for example the California standard is 225 PPMV. These limits include both fuel $NO_x$ and thermal $NO_x$. While these standards can be met when burning low nitrogen (below about 0.1 percent), petroleum derived fuel oils, serious complications are encountered when high nitrogen fuels, such as heavy petroleum derived fuel oils, crude shale oil, crude coal oils and solid coals, lignites, etc. are burned in conventional utility boilers. For example, since thermal $NO_x$ increases with temperature, modern utility boilers, which preheat the combustion-supporting air to 600° to 800° F. for improved efficiency, produce thermal $NO_x$ alone which can approach the specified emission standards. Consequently, in order to meet these standards, the conversion of fuel nitrogen to $NO_x$ emissions, in a fuel having about 2.0 wt. percent bound nitrogen, should not be more than about 5 percent. It has been reported in the literature that, when shale oils with about 2.0 wt. percent nitrogen are burned in a stationary boiler of an electrical generating station, $NO_x$ emissions on the order of 700 to 900 PPMV can be anticipated and, when solvent refined coal oils, with slightly more than 1.0 wt. percent nitrogen are burned, at least 20 to 50 percent of the fuel nitrogen is converted to $NO_x$ emissions (260 to 650 PPMV).

While it has been suggested that high levels of fuel nitrogen can be reduced by blending the high nitrogen fuel with low nitrogen petroleum derived fuels or by burning crude high nitrogen fuels in selected burners of a boiler while burning low nitrogen petroleum derived fuel oils in other burners or the addition of additives to the fuel, the most promising technique to date has been a 2-stage, rich-lean combustion process, in which a primary combustion zone is operated fuel-rich and a secondary combustion zone is operated fuel-lean.

Another major source of air pollution is the production of $SO_x$ pollutants in the burning of fuels containing relatively large amounts of sulfur. For example, petroleum oils containing up to about 0.5 wt. percent of sulfur are considered low sulfur crudes or sweet crudes, whereas other petroleum oils contain up to about 2.5 wt. percent, or greater, of sulfur and are considered sour crudes. Generally, the sulfur content of petroleum oils, even though it is organic sulfur, can be eliminated by mild hydrotreating operations. On the other hand, the sulfur content of normally solid fuels, such as coals, lignites, etc. or liquids derived from shale, coal, lignite, etc. present an entirely different problem. Again, a coal having less than about 0.5 wt. percent sulfur is considered a low sulfur coal and can generally be utilized as such or cleaned up in a relatively simple manner to prevent air pollution. However, high sulfur coals contain anywhere from 0.5 to 8.0 percent by weight of sulfur in elemental or combined form. Sulfur in coal, depending upon the type, can be present as elemental sulfur, sulfate sulfur, mineral sulfur (ferrous disulfide-$FeS_2$ usually referred to as pyritic sulfur) or organic sulfur, which is chemically bound. Sulfate sulfur is usually present in amounts less than about 0.1 percent by weight and is water soluble. Accordingly, this type of sulfur, along with elemental sulfur can usually be removed by water washing. On the other hand, pyritic sulfur is insoluble in water, but is heavier than coal and, therefore, can be removed by specific gravity separation, i.e., flotation, etc., or by relatively simple magnetic means. The amounts of pyritic sulfur vary widely with the nature of the coal, in some cases, constituting substantially all of the sulfur content of the coal, while in others, only about half of the sulfur of the coal. On the other hand, organic sulfur can constitute as much as half of the sulfur content of a given coal and is the most difficult to remove, since it requires destruction of the coal molecule itself.

Numerous solutions for the removal or reduction of $SO_x$ pollutants, due to burning a solid fuel, such as coal, lignite, etc., have been proposed. Physical cleaning of the coal is a relatively simple and commercially practiced technique and it involves the previously mentioned specific gravity separation techniques, magnetic techniques, etc. However, such techniques remove only pyritic sulfur, elemental sulfur and sulfate sulfur and are incapable of removing organic sulfur. Synthetic fuel production, such as the production of gaseous and liquid fuels from normally solid fuels is another proposed solution. However, in both instances, these processes are expensive, have not been commercially developed and, in addition, as previously indicated, synthetic liquids contain large amounts of nitrogen, which must be removed by some other means. Yet another proposed solution, which has been commercially developed and is utilized is desulfurization of the flue gas itself. While flue gases can be treated to remove both $NO_x$ and $SO_x$ pollutants and to do so within EPA and State limits, this is a highly expensive operation. Finally, the direct burning of solid fuels, such as coal, lignite, etc., has been proposed in fluidized bed combustion processes with additives, such as limestone, dolomite, etc. to remove sulfur. However, such combustion requires expensive equipment, is difficult to control and also requires substantial volumes of additives. A more promising approach to the desulfurization of solid fuels, such as coal, etc., is the chemical cleaning of coal. A wide variety of processes are involved, including mainly solvent partition, thermal decomposition, acid-base neutralization, reduction, oxidation and nucleophilic displacement. Unfortunately, none of these techniques has been developed to the commercial stage and, in general, most are considered relatively expensive. However, it is necessary to resort to such techniques in order to remove organic sulfur.

The biggest problem, associated with the reduction of pollution in the burning of fuels, is that most fuels which contain high concentrations of nitrogen also contains high concentrations of sulfur. It has been suggested that high levels of fuel nitrogen in petroleum oils can be reduced, along with the sulfur, by severe hydrotreating techniques, i.e., at extremely high pressures and high temperatures and utilizing large amounts of $H_2$. However, such techniques do not remove sufficient nitrogen, they tend to crack the feed materials and such techniques have not been fully commercially developed. In addition, even if available, pilot plant tests indicate that such refining of crude shale oils and crude coal oils, would increase costs by about $3.00 to $5.00 per barrel. Unfortunately, researchers concerned with the removal of high levels of nitrogen from fuels have not given sufficient consideration to the removal of high concentrations of sulfur and in many cases have simply assumed that the equipment and conditions necessary for the removal of high concentrations of nitrogen will also remove high concentrations of sulfur. Similarly, researchers concerned with the removal of high concentrations of sulfur from fuels have also assumed that the same conditions and the same equipment will also be effective in the removal of sufficient nitrogen. Consequently, there is no proposed technique which will adequately and inexpensively remove high concentrations of both nitrogen and sulfur from fuels.

SUMMARY OF THE INVENTION

It is, therefore, an object of the present invention to provide an improved method and apparatus for overcoming the above-mentioned and other disadvantages of the prior art. Another object of the present invention is to provide an improved method and apparatus for burning a fuel containing high concentrations of $SO_x$ and $NO_x$ precursors. A further object of the present invention is to provide an improved method and apparatus for burning a fuel containing high concentrations of $SO_x$ and $NO_x$ precursors to produce a flue gas containing substantially reduced amounts of $SO_x$ and $NO_x$. A still further object of the present invention is to provide an improved method and apparatus in which the fuel is either a normally liquid fuel or a normally solid fuel. These and other objects of the present invention will be apparent from the following description.

In accordance with the present invention, a method and apparatus is provided for minimizing the production of $SO_x$ and $NO_x$ pollutants in the burning of a fuel containing significant amounts of $SO_x$ and $NO_x$ precursors, including treating the fuel, under conditions sufficient to remove significant amounts of the $SO_x$ precursors from the fuel but insufficient to remove significant amounts of $NO_x$ precursors from the fuel, to produce a fuel containing significant amounts of $NO_x$ precursors and reduced amounts of $SO_x$ precursors, and carrying out fuel-rich combustion by burning the fuel containing significant amounts of $NO_x$ precursors in a combination zone in the presence of an oxidizing agent in an amount less than the stoichiometric amount necessary to burn all of the fuel and for a residence time sufficient to convert a major portion of the $NO_x$ precursors to nitrogen and produce an effluent containing significant amounts of nitrogen and unburned and partially burned fuel, abruptly terminating the fuel-rich combustion and carrying out fuel-lean combustion of the effluent containing significant amounts of nitrogen and unburned and partially burned fuel by burning the effluent in the presence of additional oxidizing agent in an amount sufficient to provide a total amount of oxygen at least as great as the stoichiometric amount necessary to burn all of the fuel and for a residence time to essentially complete combustion of the fuel and produce a flue gas predominating a nitrogen and carbon dioxide and containing substantially reduced amounts of $SO_x$ and $NO_x$ pollutants.

DESCRIPTION OF THE PREFERRED EMBODIMENTS

Figure 1:
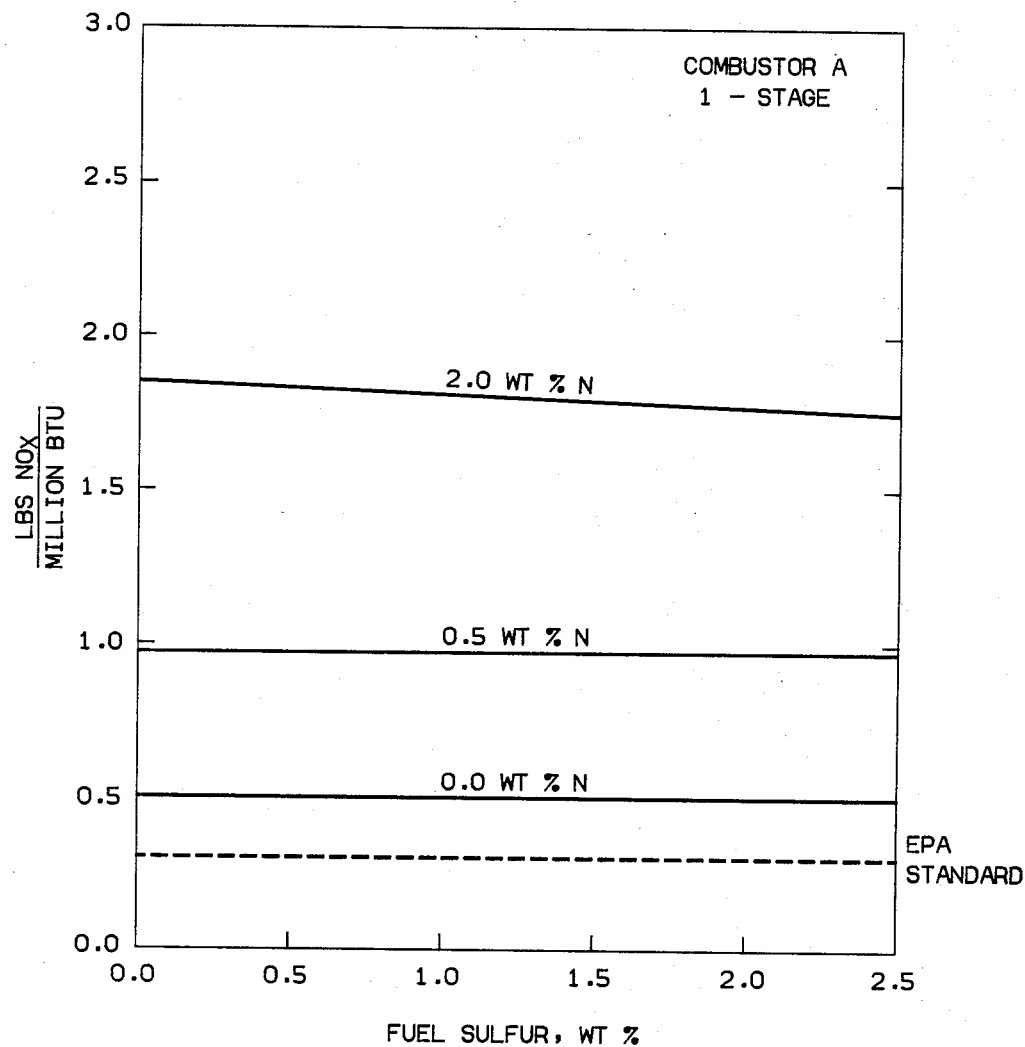
FIG. 1 is a plot of the sulfur content of a fuel vs. $NO_x$ production in the burning of the fuel when carried out in a first reactor as a single stage combustion.

The term "fuel", when utilized herein, is meant to include normally gaseous fuels, such as natural gas, propane, etc., any normally liquid fuel, such as No. 2 fuel oil, No. 6 fuel oil, diesel fuels, crude oil, other hydrocarbon fractions, shale oils, coal oils, etc., including prevaporized liquid fuels, or normally solid ash containing or ashless fuels, such as solvent refined coal oil, asphaltene bottoms, normally solid carbonaceous fuels, such as anthracite coal, bituminous coal, sub-bituminous coal, lignite, peat, petroleum coke, coal, coke, etc.

When the term "fuels containing significant amounts of $NO_x$ and $SO_x$ precursors" is referred to herein, this term is meant to include any fuel, including without limitation, nomally liquid fuels containing nitrogen chemically bound into the fuel molecule and referred to by terms such as "fuel-nitrogen", "chemically bound nitrogen", "organic nitrogen" and similar terms, usually in amounts in excess of about 0.5 wt. percent nitrogen and similarly, fuels containing in excess of about 0.5 wt. percent sulfur in the form of free sulfur, hydrogen sulfide, pyritic sulfur ($FeS_x$ where x is anywhere from 0.5 to 4), sulfate sulfur and organic sulfur chemically bound into the fuel molecule.

The term "hydrogen containing fuel" is meant to include normally gaseous, normally liquid and/or normally solid fuels containing hydrogen capable of producing hydrogen or perhydroxy radicals upon burning of the fuel.

The term "combustion supporting material," "oxidant", "oxidizing gas" or "oxidizing agent" is meant to include any material capable of supplying oxygen in an amount sufficient to support combustion of a fuel, including without limitation, air, oxygen, oxygen-enriched air, oxygen containing materials, etc.

The terms "fuel-$O_2$ equivalence ratio", "equivalence ratio" and "$\Phi$" are employed herein to refer to the ratio of the fuel flow (fuel available) to the fuel required for stoichiometric combustion with a combustion supporting material. Stated another way, fuel-$O_2$ equivalence ratio is the ratio of the actual fuel-oxygen mixture to the stoichiometric fuel-oxygen mixture. For example, an equivalence ratio of 1.5 means the fuel-oxygen mixture is fuel-rich and contains 1.5 times as much fuel as a stoichiometric mixture and an equivalence ratio of 0.5 means the fuel-oxygen mixture is fuel-lean and contains 0.5 times as much fuel as a stoichiometric mixture. Obviously, a stoichiometric mixture, by this definition, has an equivalence ratio of 1.0.

The term "oxidizing agent", when utilized herein, is meant to include any agent capable of supporting or promoting an oxidation reaction, including without limitation, air, oxygen, oxygen-enriched air hydrogen peroxide, etc.

The term "reducing agent" is meant to include any agent capable of supporting or promoting a reducing reaction, including without limitation, hydrogen, etc.

The term "quench fluid", as utilized herein, is meant to include any gaseous material, including without limitation, air, etc., or any liquid material, including without limitation, water, etc., capable of terminating by cooling, dilution or other means the burning or combustion of a fuel.

The term "water" as utilized herein, with reference to the use thereof as a quench fluid, the addition thereof to the effluent of a burning or combustion step, or the addition thereof to a reaction step, is meant to include water in its liquid or vapor state and consequently, water in its liquid state, mixtures of water in a liquid state and steam or steam, including superheated steam.

When the term "alkaline" or "alkaline material" is utilized herein, this term is meant to include materials having an alkali metal, an alkaline earth metal or an ammonium cation or compounds containing such cation.

As previously pointed out in the introductory portion hereof, methods and apparatus for burning fuels containing significant amounts of $NO_x$ precursors in a two-stage, rich-lean combustion process have been developed. A particularly effective method of this character comprises introducing the fuel and at least one stream of combustion supporting material into a primary combustion region at a fuel-$O_2$ ratio above the stoichiometric ratio and in a manner to intimately mix the fuel and combustion supporting material and establish a stabilized flame adjacent the upstream end of the primary combustion region; maintaining the flame in the primary combustion region for a period of time sufficient to produce a combustion product mixture containing less than a predetermined amount of $NO_x$ pollutants, abruptly terminating the primary combustion region, at least in part, by introducing at least one stream of a second volume of a combustion supporting material into a secondary combustion region, in an amount sufficient to produce an overall fuel-$O_2$ ratio below the stoichiometric ratio and in a manner to prevent backflow of the secondary combustion supporting material into the primary combustion region, and maintaining the flame in the secondary combustion region for a period of time sufficient to complete burning of any unburned and partially burned fuel and produce a flue gas containing less than a predetermined amount of $NO_x$ pollutants.

Summarily, for most fuels, the operating variables are within the limits which follow. The primary region fuel-$O_2$ equivalence ratio should be between about 1.0 and about 1.8, preferably, for a light fuel with high concentrations of nitrogen, the equivalence ratio is between about 1.05 and about 1.7 and, ideally, about 1.14 to about 1.56. For a heavier oil, such as shale oil, the preferred range is about 1.3 to about 1.7 and, ideally, about 1.4 to about 1.65. The residence time within the primary combustion region should be between about 30 milliseconds and about 140 milliseconds. For a light fuel, the preferred range is about 30 to about 120 milliseconds and, ideally, between about 45 and about 75 milliseconds. For heavy fuels, the preferred range is about 35 to about 140 milliseconds and ideally, about 100 to about 140 milliseconds. The fuel-$O_2$ equivalence ratio in the secondary combustion region should be such as to produce an overall fuel-$O_2$ equivalence ratio between about 0.5 and 1 and, preferably, between about 0.575 and 0.87. The residence time in a secondary combustion region should be at least about 15 milliseconds and preferably at least about 30 milliseconds. Stated in terms of the results to be obtained, the fuel nitrogen of the fuel should be converted to not more than about 10 percent $NO_x$, preferably not more than 7.5 percent and, ideally, not more than 5.0 percent and the $CO_2$ content of the flue gas should be less than about 300 PPMV. For a powdered fuel, such as a typical Western Kentucky coal, these fuel $NO_x$ limits of 10 percent, 7.5 percent and 5 percent represent about 0.350, 0.262 and 0.175 lbs. fuel $NO_x$/MM BTU, respectively. Corresponding values for a typical crude solvent refined coal oil are 0.216, 0.162 and 0.108, respectively, for one type of shale oil, 0.344, 0.258 and 0.172, respectively; for a second shale oil, 0.329, 0.247 and 0.164, respectively and for a light fuel with about 2.0 percent bound nitrogen about 0.322, 0.242 and 0.161, respectively. Accordingly, operating variables should be selected and correlated to reduce the fuel $NO_x$ emissions to less than about 0.350 lbs./MM BTU, preferably, less than about 0.290 and, ideally, less than about 0.180 and the total $NO_x$ in the flue gas to less than 0.450, 0.365 and 0.275 lbs. total $NO_x$/MM BTU, respectively.

Burners suitable for use in carrying out this method, are illustrated herein in FIGS. 4, 5 and 6 of the present application and details thereof will be discussed in connection with said drawings.

Figure 2:
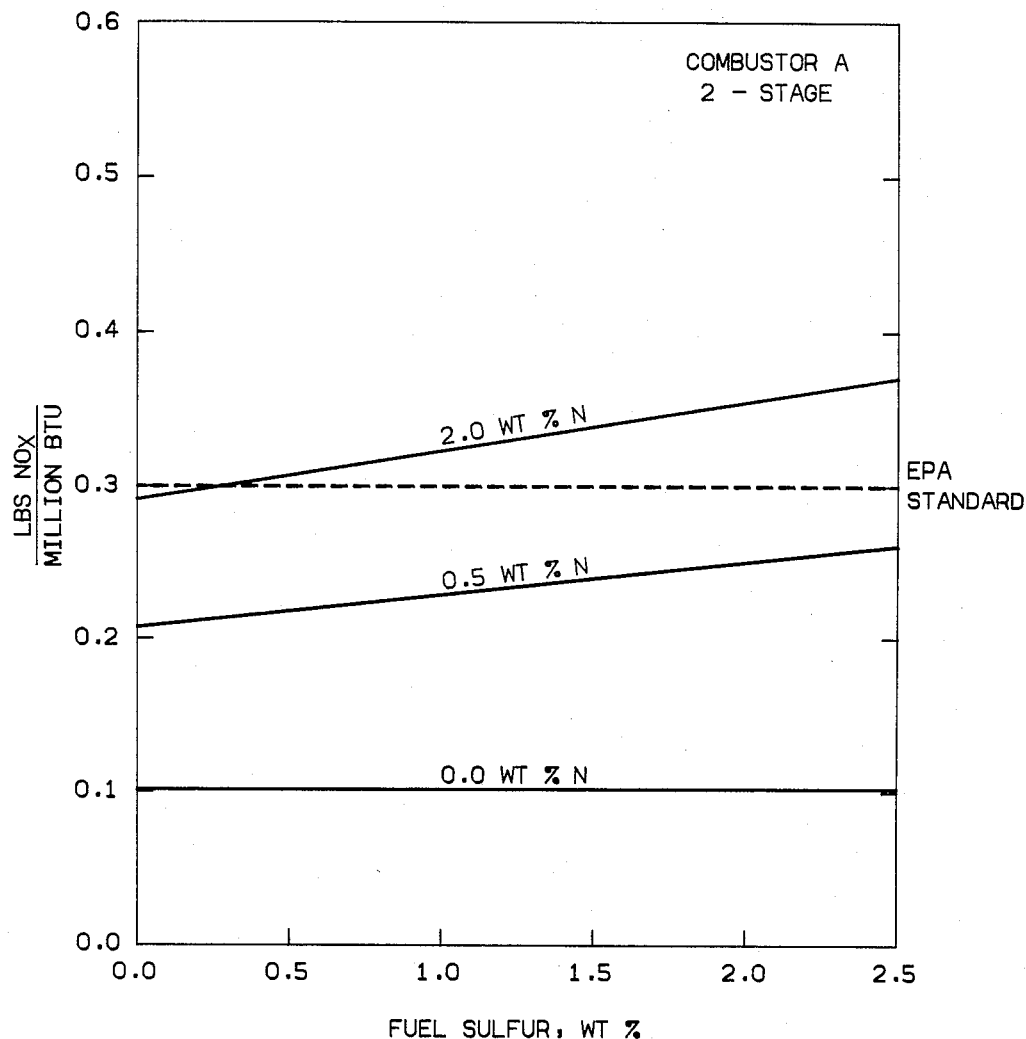
FIG. 2 is a plot of sulfur content of a fuel v. $NO_x$ produced in the burning of the fuel when carried out in the first reactor as a two-stage, rich-lean combustion.
Figure 3:
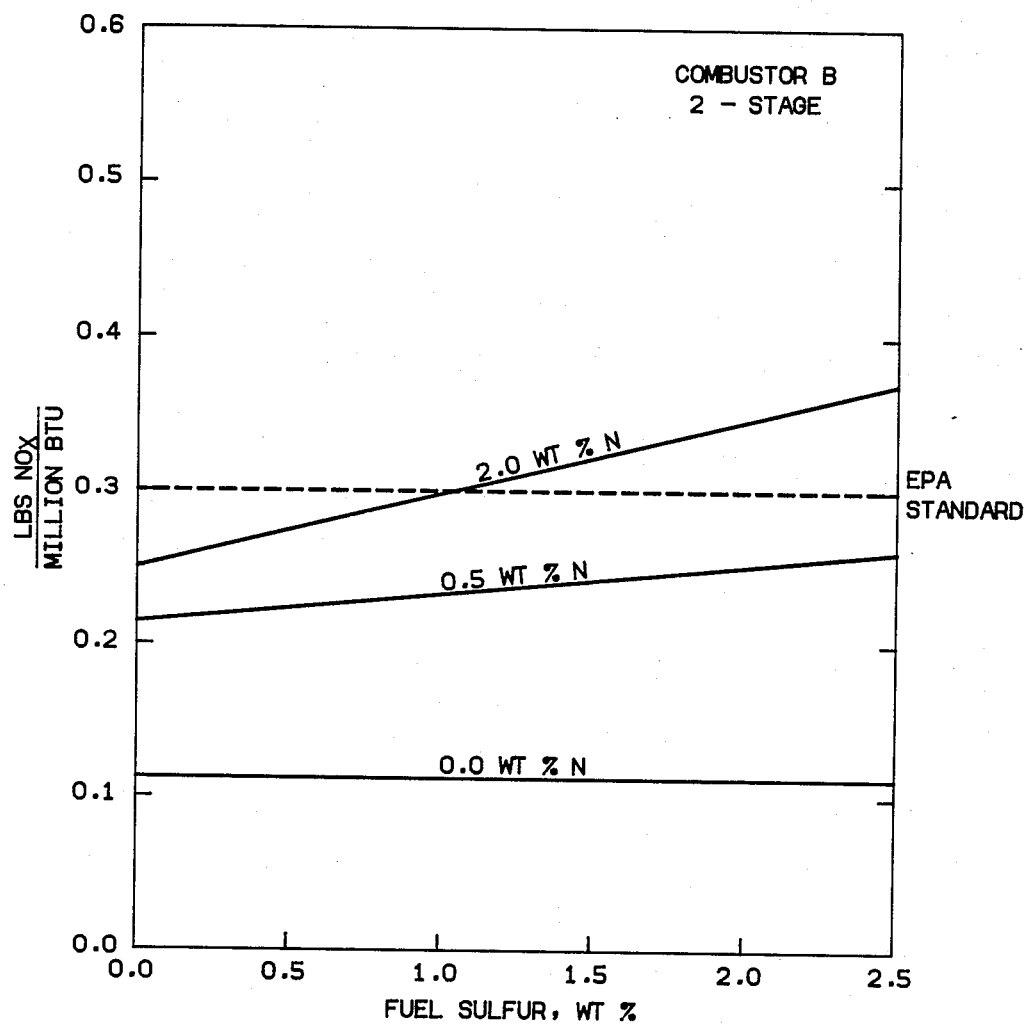
FIG. 3 is a plot of sulfur content of a fuel v. $NO_x$ production in the burning of the fuel when carried out in a second combustor as a two-stage, rich-lean combustion.

As is also pointed out in the introductory portion hereof, it has generally been assumed, by workers in the art, that the burning of a fuel under conditions and in equipment adapted to reduce $NO_x$ pollutants such as illustrated above, will also reduce $SO_x$ pollutants and, therefore, simultaneously, desulfurize the fuel. However, it has been discovered, in accordance with the present invention, that while the presence of significant amounts of $SO_x$ precursors in a fuel does not appear to affect $NO_x$ pollutant production when combustion of the fuel is carried out in a single stage, conventional combustion process, the presence of such $SO_x$ precursors in a fuel burned in a two-stage, rich-lean combustion process does, in fact, adversely affect the combustion process. This is illustrated by FIGS. 1, 2 and 3 of the drawings.

Figure 4:
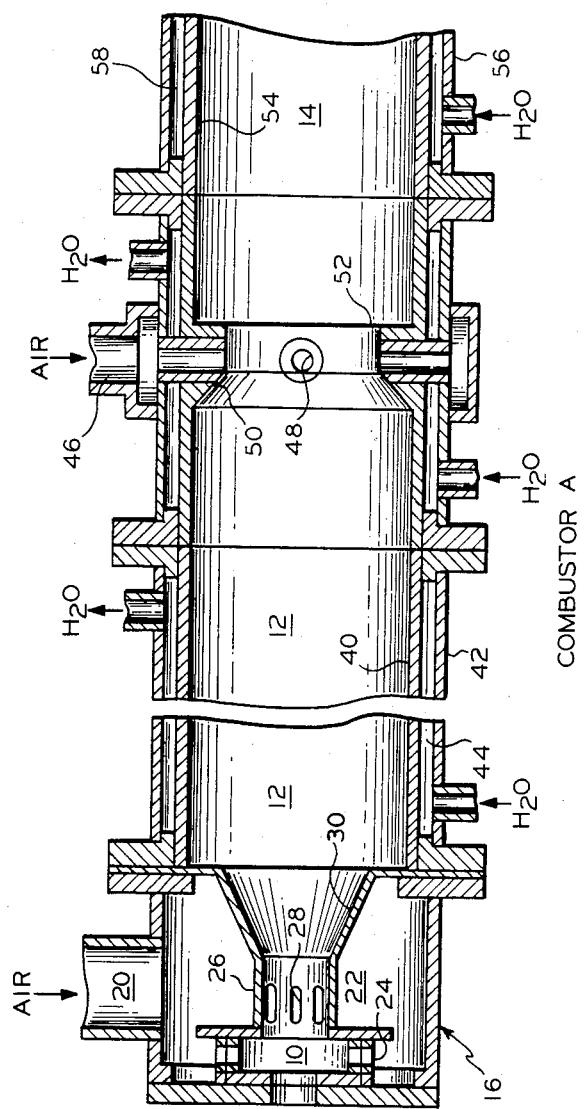
FIG. 4 is a side view, partially in cross section, of the first combustor utilized in the production of the plots of FIGS. 1 and 2.
Figure 5:
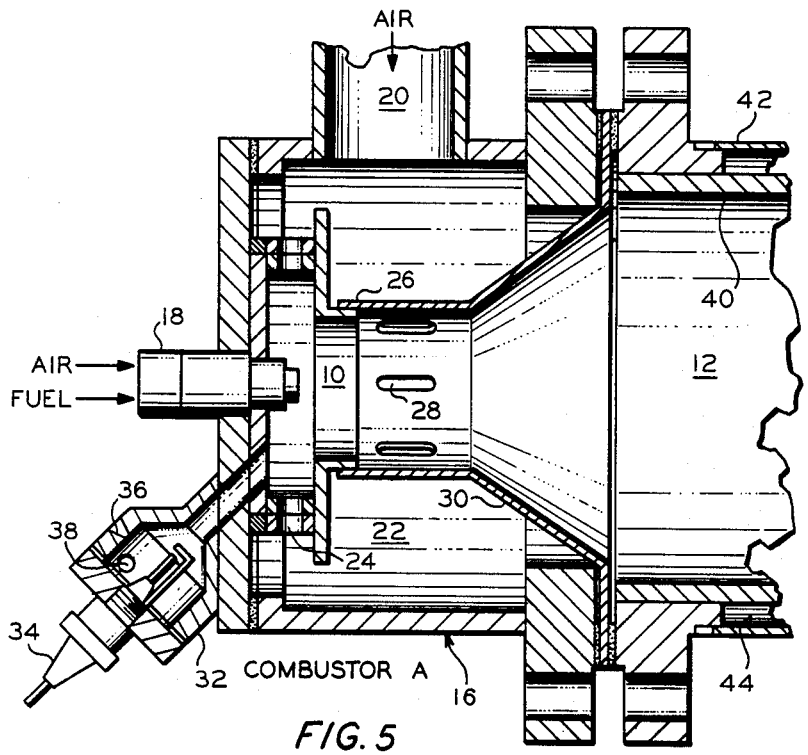
FIG. 5 is a side view, partially in cross section, showing the details of the upstream end of the combustor of FIG. 4.

FIGS. 4 and 5 illustrate a combustor referred to herein as Combustor A. Combustor A was utilized to obtain the data plotted in FIGS. 1 and 2 of the drawings and is a preferred two-stage, rich-lean combustor for the burning of a liquid fuel to reduce $NO_x$ precursors in accordance with the present invention. The combustor comprises a flame tube having an upstream fuel-air mixing section 10, an intermediate primary or fuel-rich combustion section or region 12 located downstream from and in open communication with mixing section 10 and a secondary or fuel-lean combustion section or region 14 located downstream from and in open communication with the fuel-rich combustion section 12. The flame tube is provided at its upstream end with a dome member 16. Axially disposed in the upstream end of dome member 16 is a fuel inlet means 18. The fuel inlet means 18 is provided for introducing a stream of fuel into the upstream end portion of mixing section 10. In the particular embodiment shown, the fuel introduction means 18 is an air-assisted fuel nozzle. This particular fuel nozzle is particularly advantageous for use with heavy oils such as shale oil, since it serves to break up droplets of fuel by means of an air blast feature. A particular nozzle for this purpose is available from Delavan Manufacturing Company, West Des Moines, Iowa, as an "air blast nozzle" and is available for different flow capacities and fuel-air ratios. In the particular example given, the mixture of air and fuel exits the nozzle 18 as a diverging cone, having an exit angle of about 90°. Additional air is introduced into dome member 16 through conduit 20 and thence into an annular chamber 22. Air from annular chamber 22 passes into the mixing zone 10 through a plurality of peripherally disposed openings 24, which introduce this portion of the air as a plurality of radial jets or streams toward the axis of the mixing chamber 10. The air passing through openings 24 contacts the air and fuel issuing from the nozzle 18 in mixing chamber 10 and some mixing takes place, and the fuel, the first portion of air from nozzle 18 and the second portion of air from openings 24 then pass through a necked down portion 26 of the mixing chamber 10. As the fuel and the first and second volumes of air pass through necked down section 26, a third portion of air is introduced into the mixing zone 10 through the plurality of peripherally disposed slots 28. Slots 28, in a manner similar to openings 24, introduce air into the mixture of fuel, the first volume of air and the second volume of air as radial jets towards the axis of the fuel-air mixture and the reduction in diameter of the fuel-air mixture, while passing through neck 26, and the radial injection of the third portion of air through slots 28 ultimately results in production of an intimate mixture of the fuel and the first, second and third portions of air. The first, second and third portions of air introduced through nozzle 18, openings 24 and slots 28, constitute what is termed herein the first volume of air and the resultant mixture is the fuel-rich mixture referred to hereinafter. The fuel-rich mixture then passes through diverging section 30, constituting the upstream end of fuel-rich combustion zone 12. Dome member 16 is also provided with an appropriate ignition means 32, including a spark plug 34, a fuel inlet 36 (for a fuel such as propane) and an air inlet 38. For lighter fuels, a simple spark plug-type igniter or electrical igniter could be utilized. In this particular instance, for a heavy fuel, the ignition means 32 is what is known as a propane torch lighter. The fuel-rich combustion region 12 is further defined by an inner burner wall 40 and an outer wall 42, which form therebetween an annular chamber 44, through which water or another cooling medium, can be circulated to maintain a predetermined temperature in fuel-rich combustion section 12 and to cool the inner wall 40 thereof, thus preventing the formation of deposits on the inner wall 40. The flame front, in passing through fuel-rich combustion zone 12, results in a flame front at the downstream end of fuel-rich combustion zone 12, comprising $NO_x$ precursors in the form of nitrogen and combustion products, including carbon dioxide and a certain amount of unburned fuel and partially burned fuel, represented by hydrogen and carbon monoxide. In addition to maintaining a proper fuel-air ratio in the fuel-rich combustion zone 12 and maintaining the fuel-rich flame front within the combustion zone 12 for a residence time sufficient to reduce most of the $NO_x$ precursors in the fuel to nitrogen, a critical factor in the operation of the combustor of FIGS. 4 and 5 is the abrupt termination of the fuel-rich combustion in zone 12 and the conversion thereof to fuel-lean combustion in fuel-lean combustion zone 14. This abrupt termination is accomplished in accordance with the preferred embodiment of the present invention by, at least in part, introducing a second volume of air through conduit 46 and thence through apertures 48, which are a plurality of peripherally disposed openings, which again introduce air as a plurality of radial jets directed toward the axis of the flame front. It is to be noted that the air inlets 24, which introduce the second portion of air into mixing zone 10, are designed as variable openings so as to adjust, if desired, the ratio of the first portion, second portion and third portion of air (first volume of air) to the second volume of air. The second volume of air, when added to the first volume of air, comprising the first, second and third portions of air, results in a total volume of air to the flame tube, at least equal to the stoichiometric amount of oxygen necessary for essentially complete combustion of the fuel. In the particular example, there is an excess of 3 percent air on a dry basis. In addition to the radial impingement of the second volume of air into the flame front, in this preferred embodiment, the flame front is converged and then expanded by locating a nozzle between the upstream fuel-rich combustion zone and the downstream fuel-lean combustion zone, while simultaneously introducing the second volume of air into the vena contracta of the nozzle. Specifically, an annular, angular ring 50 converges, in a downstream direction, from the full diameter of the fuel-rich combustion region 12 to a reduced diameter. The second volume of air is then introduced radially downstream of ring 50 through the inlet openings 48. Still further downstream an annular ring or flange 52, having an inside diameter equal to the inside diameter of ring 50 is located. Consequently, this arrangement causes an abrupt change from the fuel-rich ratio of the fuel-rich combustion region 12 to that of the fuel-lean combustion region 14 and intimate mixing in the fuel-lean combustion region, and has the advantage that sharp corners where carbon can collect at the downstream end of fuel-rich combustion zone 12 are eliminated. In a like manner to fuel-rich combustion zone 12, fuel-lean combustion zone 14 comprises an inner burner wall 54 and an outer wall 56 defining an annular heat exchange region 58 for the circulation of a heat exchange medium, such as water.

As will be pointed out hereinafter, the fuel-lean combustion section 14 can comprise the heated section of a heat utilization means, such as a boiler, a process furnace or the like. For this purpose, instead of expanding the flame front into an elongated fuel-lean combustion section 14, the flame front is simply expanded into the heated section of the utilization means.

Figure 6:
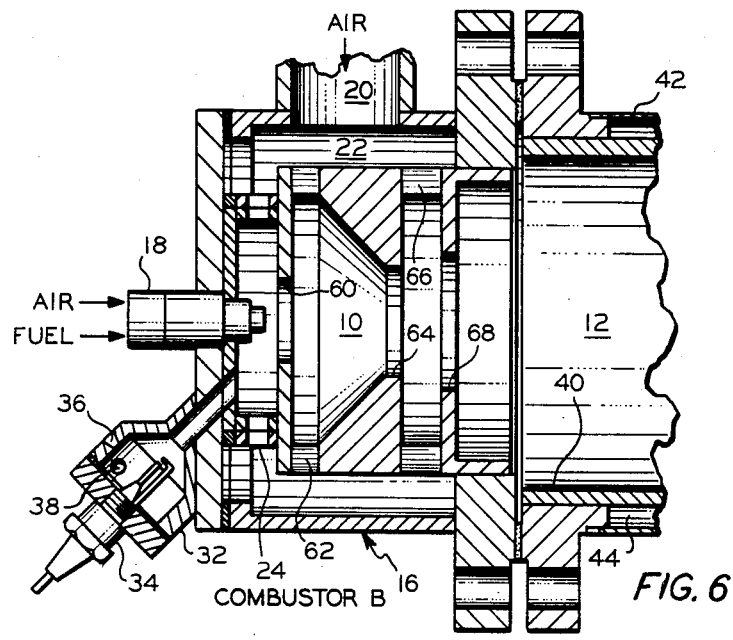
FIG. 6 is a side view, partially in section, of the upstream end of the combustor utilized in the production of the plot of FIG. 3.

Combustor B shown in FIG. 6 of the drawings differs from Combustor A of FIGS. 4 and 5 solely in the means of introducing the first volume of air into the mixing zone 10 and attaining an intimate mixture of the fuel and the first volume of air. Specifically, the first portion of air and fuel is introduced through nozzle 18 in the same manner as in Combustor A and the second portion of air is introduced through the openings 24. This mixture of the fuel and the first and second portions of air then pass through an orifice 60, which reduces the diameter of the mixture and then abruptly expands the mixture. A third portion of air is then introduced tangentially through angularly disposed openings 62 about the periphery of the mixing zone to thereby introduce this third portion of air as a swirling or rotating component. This mixture of the fuel and the first, second and third portions of air are then diverged through a second orifice 64 and abruptly expanded. A fourth volume of air is then introduced through a plurality of peripherally disposed, tangential slots 64 to again produce a swirling or rotating body of air. In the preferred means of operating the combustor, the air introduced through tangential slots 62 and that introduced through tangential slots 66 swirl or rotate in opposite directions, thereby aiding in the mixing of the fuel and air. At this point, the mixture of the fuel and the first, second, third and fourth portions of air pass through a third orifice 68 and is then abruptly expanded into the fuel-rich combustion zone 12. From this point on, the downstream end of the fuel-rich combustion zone 12, the means for abruptly terminating the fuel-rich combustion and the completion of combustion in the fuel-lean combustion zone 14 are the same as in FIGS. 4 and 5 (Combustor A).

Referring again to FIG. 1 of the drawings, an experiment was carried out in which Combustor A, of FIGS. 4 and 5, was utilized as a single stage or conventional combustor. While Combustor A is basically designed as a two-stage, rich-lean combustor, it can be operated as a single stage combustion means by simply introducing all of the air, through the nozzle 18, the openings 24 and the slots 28, rather than splitting the air into a first volume of air (including the first, second and third portions of air) to the fuel-rich combustion zone 12 and the second volume of air adjacent the upstream end of fuel-lean combustion zone 14. In other words, the total air introduced through nozzle 18, openings 24 and slots 28 provides sufficient oxygen for essentially complete combustion of the fuel with an excess of about 3 percent oxygen on a dry basis. The fuel employed was a hydrotreated No. 1 fuel oil to which were added required amounts of ditertiary butyldisulfide to obtain desired concentrations of fuel-sulfur and pyridine to obtain desired concentrations of fuel-nitrogen. The combustor was operated so as to obtain optimum stoichiometry and optimum fuel-air mixing in the upstream end of the combustor, which would normally produce minimum $NO_x$ emissions if the burner were operated as a two-stage rich-lean combustor. The results of this test are plotted in FIG. 1. It is to be observed that, when operating in a single stage combustion mode, there is no noticeable effect of fuel sulfur content on the production of $NO_x$ pollutants in the flue gas from the combustor when the combustor also contains high concentrations of fuel nitrogen. If any effect of fuel sulfur on the production of $NO_x$ pollutants could be observed, it was that at high fuel sulfur and fuel nitrogen concentrations, the presence of fuel sulfur resulted in slightly lower productions of $NO_x$ pollutants in the flue gas.

Combustor A was then operated in a two-stage, rich-lean mode, utilizing the same fuel containing the same amounts of ditertiary butyldisulfide and/or pyridine to represent fuel-sulfur and fuel-nitrogen. Previously described procedures were followed to achieve optimum stoichiometry and optimum fuel-air mixing in the fuel-rich combustion zone, optimum termination of fuel-rich combustion and optimum combustion in the fuel-lean combustion section. The results of this test were plotted as FIG. 2. It is to be observed that, contrary to the assumptions of prior workers in the art and contrary to what would be expected from a single stage combustion illustrated in FIG. 1, the presence of fuel-sulfur has an adverse effect on the reduction of $NO_x$ pollutants in the flue gas from a two-stage, rich-lean combustor. Specifically, it is to be noted that, as the content of fuel sulfur increases and the content of fuel nitrogen increases, the $NO_x$ pollutants from the flue gas from the two-stage, rich-lean combustion also increase significantly.

The difference between the total fuel $NO_x$ production in the single stage operation and the total fuel $NO_x$ production in the two-stage rich-lean combustion are the result of the single stage mode of operation as opposed to the two-stage mode of operation. It is to be noted that in the single stage mode of operation, thermal $NO_x$ resulting from the nitrogen in a combustion air was sufficient to produce $NO_x$ pollutants in the flue gas above the EPA standard, even without the presence of fuel nitrogen and, with fuel nitrogen also present, the $NO_x$ pollutants increase substantially as the percent fuel nitrogen increased. On the other hand, except for the adverse effect that high concentrations of fuel sulfur had on fuels containing the highest concentration of fuel nitrogen, the $NO_x$ pollutant content of the flue gas from the two-stage, rich-lean combustion was below the EPA standard. Obviously, in all cases, regardless of the amount of fuel nitrogen, where the fuel contained no fuel sulfur, a two-stage, rich-lean combustor can produce flue gases containing amounts of $NO_x$ pollutants below the EPA standard.

In order to determine whether the results obtained in the first two experiments were affected by the manner of fuel-air mixing at the upstream end of the combustor, the experiment was repeated in Combustor B, having the configuration shown in FIG. 6. Again, optimum conditions for minimum production of $NO_x$ pollutants were maintained throughout the experiment. It is to be noted from the results plotted in FIG. 3, that Combustor B, when operated in the two-stage, rich-lean mode for minimum $NO_x$ pollutant production, produced results essentially the same as those obtained by the use of Combustor A. The only noticeable difference was that $NO_x$ pollutant production was slightly better when the fuel contained 2 wt. percent fuel nitrogen and 0 percent fuel sulfur, it was slightly worse when the fuel contained 2 percent fuel sulfur and 2 percent fuel nitrogen.

Based on the above discovery, in accordance with the present invention, a fuel containing high concentrations of $NO_x$ precursors and high concentrations of $SO_x$ precursors can be effectively burned with a minimum of $NO_x$ pollutants and $SO_x$ pollutants in the flue gas by treating the fuel, under conditions sufficient to remove significant amounts of $SO_x$ precursors from the fuel but insufficient to remove significant amounts of $NO_x$ precursors from the fuel to produce a fuel containing significant amounts of $NO_x$ precursors and reduced amounts of $SO_x$ precursors, and carrying out fuel-rich combustion, by burning the fuel containing significant amounts of $NO_x$ precursors and reduced amounts of $SO_x$ precursors in a combustion zone in the presence of combustion supporting material in an amount less than the stoichiometric amount necessary to burn all of the fuel and for a residence time sufficient to convert a major portion of the $NO_x$ precursors to nitrogen and produce an effluent containing significant amounts of nitrogen and unburned and partially burned fuel, abruptly terminating the fuel-rich combustion and carrying out fuel-lean combustion of the effluent containing significant amounts of nitrogen and unburned and partially burned fuel, by burning the effluent in the presence of additional combustion supporting material in an amount sufficient to provide a total amount of oxygen at least as great as the stoichiometric amount necessary to burn all of the fuel and for a residence time sufficient to essentially complete combustion of the fuel and produce a flue gas predominating a nitrogen and carbon dioxide and containing substantially reduced amounts of $SO_x$ and $NO_x$ pollutants. This is illustrating by FIG. 7 of the drawings.

Figure 7:
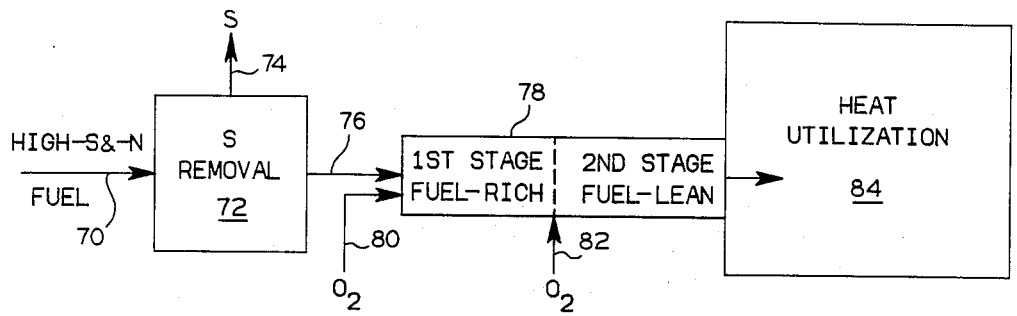
FIG. 7 is a flow diagram of a method for burning a fuel containing sulfur and nitrogen in accordance with one aspect of the present invention.

In accordance with FIG. 7, a fuel, containing high concentrations of fuel sulfur and fuel nitrogen, is introduced through line 70. The fuel may be any normally gaseous, normally liquid or normally solid fuel, provided only that it contains high concentrations of $SO_x$ and $NO_x$ precursors, which, upon conventional combustion, would produce flue gases containing unacceptable quantities of $SO_x$ and $NO_x$ pollutants. Primarily, however, the method is directed to normally liquid and normally solid fuels, since sulfur will generally be present in normally gaseous fuels as hydrogen sulfide, which can be readily removed by conventional absorption and other techniques and, more importantly, normally gaseous fuels seldom, if ever, contain high concentrations of $NO_x$ precursors. The fuel is passed to treating unit or sulfur removal unit 72. Sulfur removed in treating unit 72 is discharged through line 74. Treating unit 72 may be any conventional sulfur removal unit or system, provided only that it is adapted to remove substantially all or at least a significant amount of $SO_x$ precursors from the fuel, while at the same time, leaving the majority of the $NO_x$ precursors in the fuel. As will be apparent hereinafter, this is a very distinct advantage since $SO_x$ precursors can normally be removed by simple and economic techniques, whereas the removal of both $SO_x$ and $NO_x$ precursors or $NO_x$ precursors alone is extremely difficult and in some cases, almost impossible. The fuel containing $NO_x$ precursors and substantially free of $SO_x$ precursors is then passed through line 76 to two-stage, rich-lean burner 78. The two-stage, rich-lean combustor 78 is preferably a combustor of the character previously described with reference to FIGS. 4, 5 and 6 or appropriate modifications thereof, provided it will function as previously described and is operated in the manner previously described.

Summarily, the fuel is mixed with a combustion supporting material, introduced through line 80, to obtain an intimate mixture of fuel and combustion supporting material. The combustion supporting material may be any appropriate material, such as oxygen, oxygen enriched air or, preferably, air. The mixture is burned in the fuel-rich first stage at a fuel-air ratio and for a residence time which will prevent the formation of thermal $NO_x$, if air is utilized, and convert fuel nitrogen $NO_x$ precursors to nitrogen and produce an effluent containing unburned and partially burned fuel and predominant amounts of nitrogen, as opposed to $NO_x$, $CO_2$ and CO. The first stage fuel-rich combustion is abruptly terminated by, at least in part, introducing a second volume of air through line 82. The air through line 82 is preferably introduced as a plurality of radial jets toward the axis of the flame front and is introduced immediately adjacent means adapted to abruptly expand the flame front or reduce the peripheral dimension of the flame front and thereafter abruptly expand the same, as previously described in detail. The air added through line 82 is sufficient to provide a total amount of oxygen when added to the air introduced through line 80 to produce an overall fuel-air mixture which is at least equal to the stoichiometric amount of oxygen necessary to burn all of the fuel, usually in excess over the stoichiometric amount, for example, 3 percent when measured on a dry basis. This mixture is then burned under fuel-lean conditions in the second stage of burner 78 to essentially complete combustion of the fuel, namely, complete burning of the unburned fuel and partially burned fuel. The resultant flue gas is then discharged into the heated section of any appropriate heat utilization means 84. Heat utilization means 84 may be any well-known heat utilization means, including utility boilers, steam generators, process heaters, or the like.

In accordance with one embodiment of the present invention, treating unit 72 is a hydrotreating or hydrodesulfurization unit. The hydrodesulfurization unit is operated under mild hydrodesulfurization conditions, which are adequate to remove substantially all of the fuel sulfur from the feed, but remove little or none of the fuel nitrogen therefrom. Specifically, if the feed is a heavy residual oil, a shale oil, a coal oil or the like containing large amounts, for example 3 to 5 percent of sulfur, desulfurization would be carried out by passing the feed over a suitable hydrodesulfurization catalyst, such as cobalt-molybdenum, nickle-molybdenum, etc., in the presence of hydrogen at a temperature of about 680° to 760° F. and a pressure of about 1500 to 2000 psia. The liquid hourly space velocity would be between about 0.2 to 0.4, preferably about 0.3 volumes of liquid/volume of catalyst/hr. Hydrogen partial pressure should be approximately 2500 SCF/BBL of feed. Hydrogen consumption and therefore hydrogen makeup will generally range between about 700 and 1,000 SCF/BBL feed. Obviously, even more mild conditions, particularly lower temperatures, lower pressures and lower hydrogen consumptions could be utilized for removing smaller amounts of sulfur from the feed. On the other hand, in order to also remove fuel nitrogen or $NO_x$ precursors from the feed, it would be necessary that the conditions be substantially more severe. For example, temperatures upward of about 850° F. or higher, pressures of about 3,000 psia and higher with hydrogen consumptions of 1400 or more SCF/BBL.

The equipment for carrying out the process is well known in the art and includes any conventional combinations of reactors, separators, absorbers and fractionators. Hydrogen partial pressures are maintained in the unit by recycling hydrogen as well as hydrogen make-up from an appropriate source.

Figure 8:
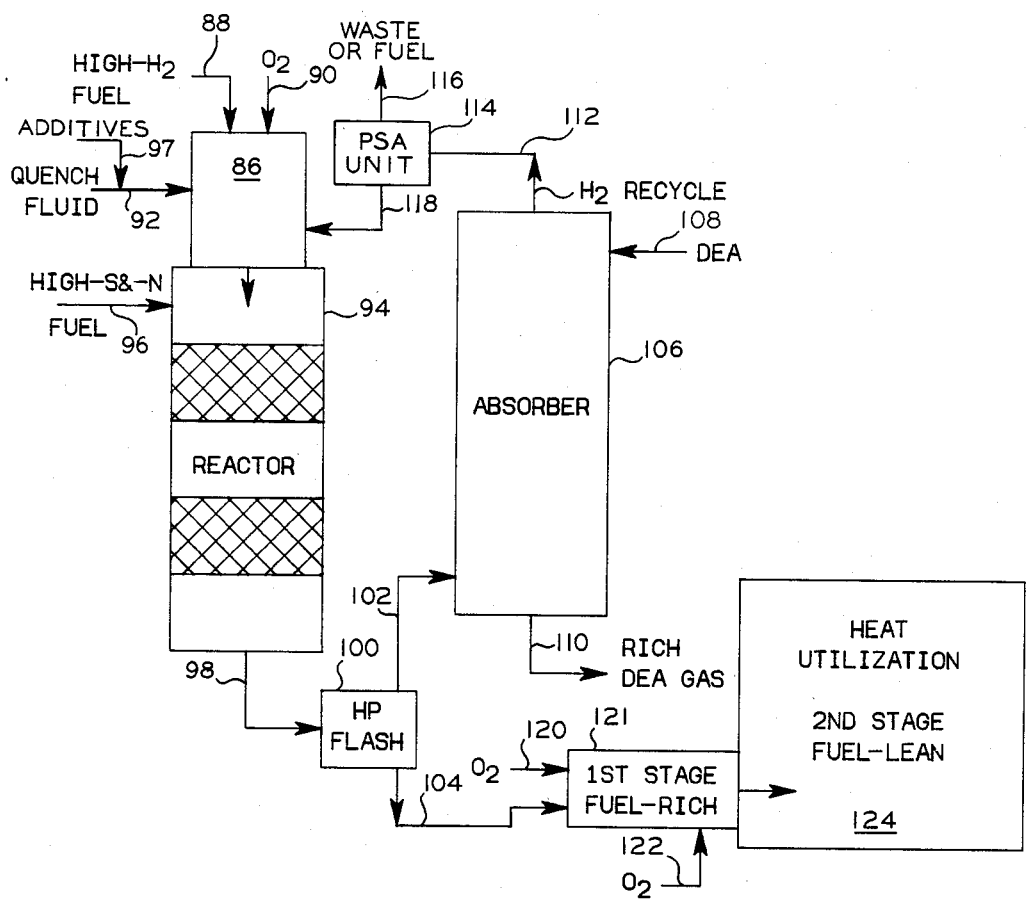
FIG. 8 is a flow diagram illustrating a method of burning a fuel containing sulfur and nitrogen in accordance with a second aspect of the present invention.

FIG. 8 of the drawings schematically shows a highly energy efficient modification of the combination of FIG. 7, in accordance with another aspect of the present invention.

In accordance with FIG. 8, the numeral 86 designates a combustor adapted to produce an effluent containing an oxidizing agent such as an oxygen containing gas, for example oxygen-enriched air, air, hydrogen peroxide, etc., a reducing agent, for example hydrogen, etc., and/or steam. Appropriate combustors for performing this function will be described hereinafter with reference to FIGS. 11, 12, 13 and 14 of the drawings. In the specific example, combustor 86 is a combustor adapted to produce an effluent containing hydrogen. For this purpose, a hydrogen-containing fuel is introduced through line 88. This fuel can be any normally gaseous, normally liquid or carbonaceous fuel which contains, preferably, a high hydrogen to carbon ratio. For example, natural gas, which is principally methane, will produce the highest volume of hydrogen. However, any appropriate fuel capable of producing significant amounts of hydrogen can be utilized, including most liquid hydrocarbons. The fuel is mixed with a combustion supporting material, preferably oxygen, oxygen-enriched air or air, introduced through line 90, to produce an intimate mixture of fuel and an oxygen containing gas adjacent the upstream end of combustor 86. The fuel-air ratio is designed to provide a fuel-rich mixture, ranging anywhere from an equivalence ratio of 1.0 to 4.0. Specifically, the equivalence ratio for natural gas could be anywhere between 1.0 and 4.0 and, preferably, about 2.0. For propane, the range would be between about 1.0 and 2.5 and preferably about 1.7 and for most liquid hydrocarbons, between 1.0 and 2.0, preferably, about 1.5. The residence time would preferably range between about 2 to 4 milliseconds, preferably about 3 milliseconds for a gas, such as natural gas, up to about 10 milliseconds for heavy liquid, such as shale oils. An additional 10 milliseconds is usually necessary to vaporize a liquid fuel. Under these conditions, maximum amounts of hydrogen are generated while producing an essentially soot-free effluent. As is the case in the operation of the previously described two-stage fuel-lean combustor, a critical factor in the operation of combustor 86 is an abrupt termination of the burning step so as to prevent formation of other products from the thus produced hydrogen. This abrupt termination of the burning step, therefore, includes the injection of a quench fluid through line 92. The quench fluid, in the specific example, is preferably the same material as the combustion supporting material, for example air, but may also be water, to thereby simultaneously produce steam. In any event, the effluent from combustor 84 contains upwards of about 10 volume percent of hydrogen (the hydrogen conversion efficiency being about 50% of the hydrogen content of the fuel) CO, $CO_2$ and $N_2$ if air is utilized, and, if water is used as a quench fluid, steam. The effluent from combustor 86 is preferably introduced directly into reactor 94. A fuel containing high concentrations of $SO_x$ and $NO_x$ precursors is introduced to reactor 94 through line 96 and is appropriately any of the previously discussed fuels. Reactor 94 will of course be a reactor which requires the presence of a reducing agent, an oxidizing agent and/or steam to carry out the appropriate reaction. In some instances, additives, such as alkaline materials, which will be hereinafter referred to in more detail, are introduced through line 97 along with the quench fluid or at any point downstream of the quench in combustor 86 or in reactor 94 itself. In the specific example under discussion, the reactor 94 is an appropriate hydrotreating or hydrodesulfurization unit. One of the distinct advantages of operating in accordance with this embodiment is that the effluent from burner 86 is discharged directly into the reactor 94, thereby eliminating the usual heat losses which occur when conventional steam generators, process heaters, furnaces and the like are utilized to provide heat for a given reaction. Thus, in most cases, all of the heat necessary for the conduct of the reaction in reactor 94 is supplied by combustor 86, while at the same time providing a reducing or oxidizing atmosphere. In addition, where an elevated pressure is required in reactor 94, combustor 86 also can maintain the pressure within any desired limits. Thus, it is again unnecessary to utilize outside sources of pressure, such as compressors for compressing hydrogen, etc., to build up and maintain a high pressure necessary for the operation of the reaction in reactor 94. In the exemplified situation, the only outside energy sources necessary are appropriate pumps for fuel and quench fluid and the fuel to the reactor and an air compressor for the combustion supporting material, and, if the fuel to combustor 86 is a gas, in some cases a gas compressor. In any event, however, the equipment necessary, in accordance with this aspect of the present invention, is much more simple and energy efficient than the conventional sources utilized in the prior art. The desulfurized fuel from reactor 94 is discharged through line 98 and thereafter treated in a conventional manner. For example, the desulfurized fuel is passed to high pressure flash unit 100, or several sequential flash units, to flash gases from the fuel. The flashed gases are passed through line 102 and the fuel through line 104. The flashed gases will, in the example, contain hydrogen, hydrogen sulfide, nitrogen, CO and $CO_2$, as previously mentioned. An appropriate means for removing the sulfur from these gases is by the use of a diethanolamine absorber 106. In the operation of the absorber 106, diethanolamine is introduced through line 108 and diethanolamine containing absorbed $H_2S$ is discharged through line 110. Hydrogen containing gas is discharged from unit 106 through line 112 for recycle to the reaction. Normally, this recycle gas will also contain nitrogen and certain other contaminants, which, in certain instances, it is desired to remove from the hydrogen for recycle. Where concentration of the hydrogen stream or where removal of the contaminants is desired, any of a wide variety of separation means may be utilized. For example, cryogenic separation, conventional adsorption techniques, heatless adsorption, as described in U.S. Pat. No. 3,069,830, and "Upgrading Hydrogen Via Heatless Adsorption" appearing in PHYSICAL ADSORPTION PROCESSES AND PRINCIPLES, 74 Vol. 63, 1967, pp. 50–52, diffusion through palladium, etc." However, in accordance with the preferred operation, the hydrogen is removed from contaminant gases by passing the same through "pressure swing adsorption" unit 114. This particular separation technique is capable of producing highly concentrated hydrogen streams by removing almost any contaminating gases therefrom. Briefly, gases are passed through a unit containing an adsorbent, such as molecular sieves, activated carbon, silica gel and the like, at a high pressure to preferentially pass the hydrogen while adsorbing contaminant gases on the adsorbent. Thereafter, the adsorbent is purged of contaminant gases by lowering the pressure without any significant change in temperature. Such an operation is described in detail in "Pressure Swing Adsorption," CHEMICAL ENGINEERING PROGRESS, Vol. 65, No. 9, September, 1969, pp. 78–83. The contaminant gases separated in pressure swing adsorption unit 114 are discharged through line 116 and may be disposed of as a waste material or processed to recover components thereof or utilized as a fuel in the process, provided the pressure and heating value thereof make such use economically feasible. The concentrated hydrogen stream is then passed through line 118 to the reaction and its introduction may take place anywhere in combustor 86 following termination of the combustion, i.e., introduction as quench fluid, or after the quench fluid or into reactor 94. In some cases, it may be necessary to generate hydrogen and recycle hydrogen before introduction of the fuel into reactor 94 until the desired hydrogen partial pressure is built up in the reactor and to, thereafter, introduce feed fuel into the reactor. Hydrogen sulfide may be removed from diethanolamine solution discharged through line 110 by appropriate means and thereafter recovered, if desired, by a process, sch as the Claus process, Sulfreen, Stretford or SCOT (Shell Claus Off Gas Treating), in order to produce sulfur from the hydrogen sulfide. The desulfurized fuel passing through line 104 is then subjected to a two-stage, rich-lean combustion, as previously described. In the illustrated case, however, combustion supporting gas is introduced through line 120 and intimately mixed with the fuel from line 104. The fuel is burned under fuel-rich conditions in the first stage of the combustor and fuel-rich combustion is abruptly terminated by, at least in part, introducing air through line 122 in the same manner as previously described. However, the system of FIG. 8 differs from that of FIG. 7 to the extent that a heat utilization means 124 is also utilized as the second stage fuel-lean combustion. In order words, the effluent from the fuel-rich combustion plus the second volume of air necessary to produce an overall equivalence ratio above stoichiometric is abruptly expanded into the heat utilization means, where combustion is completed.

While the above-described technique for treating materials containing $SO_x$ precursors is primarily useful for treating streams of normally liquid materials, it should be recognized, at this point, that the technique is also useful for the treatment of normally solid carbonaceous materials, such as coals, etc. For example, The Institute of Gas Technology has proposed a process for hydrotreating pulverized coal in order to remove sulfur therefrom. In accordance with this technique, coal ground to a fineness of $-14$ mesh is treated with hydrogen at a temperature of about 1500° F., for a residence time of about thirty minutes and at atmospheric pressure, preferably in a fluidized bed operation. The technique of the present invention, previously described with reference to FIG. 8, can also be utilized in a process of this nature wherein the combustor 86 is operated to produce significant amounts of hydrogen and the effluent from combustor 86 is passed directly to a hydrotreating or hydrodesulfurization unit 94. Thus, in accordance with the present invention, combustor 86, not only supplies hydrogen necessary for the hydrotreating operation, but necessary heat in a fuel efficient operation and the effluent from combustor 86 can also be utilized as a fluidizing medium for a fluidizing bed operation. In the IGT technique, the pulverized coal is also subjected to an oxidative pretreatment at a temperature of about 750° F., at atmospheric pressure to prevent caking of a coal which has caking tendencies and also to increase sulfur removal. As will be described in connection with FIG. 9 hereof, treatment of a material such as powdered coal with an oxidizing agent, passing the effluent from a combustor directly into a reactor, and carrying out the reaction in the presence of an oxidizing agent generated in the burning step in the combustor, utilized as a quench fluid to terminate the burning in the combustor, added to the effluent of the combustor or added to the reaction step can also be utilized. Hence, the pretreatment step of the IGT process can also be carried out in accordance with the present invention. The IGT technique is described in somewhat greater detail in "Coal Cleaning Technology", published by Noyes Data Corporation and edited by D. L. Khoury (1981) at pps. 245–257.

Figure 9:
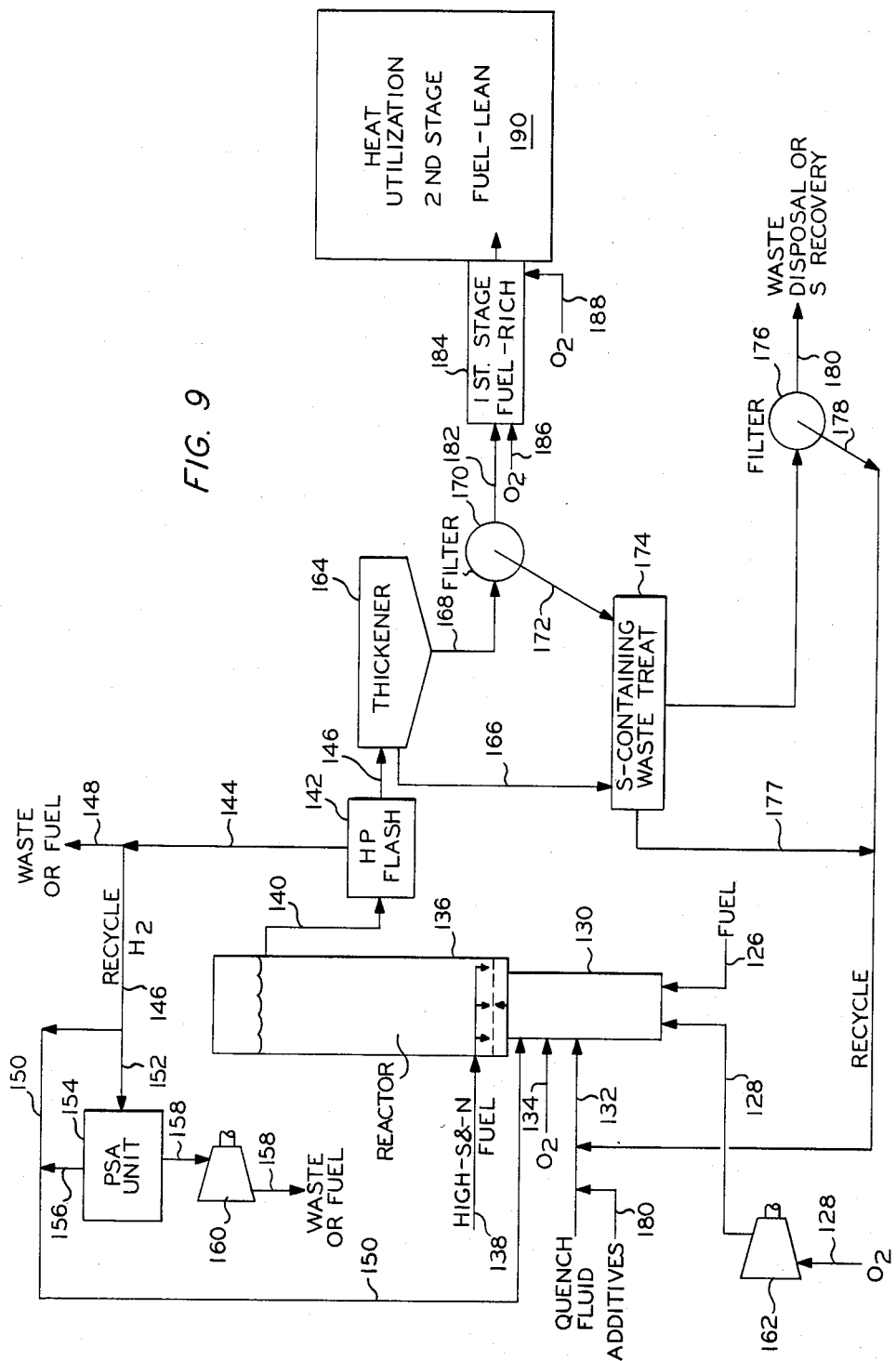
FIG. 9 is a flow diagram illustrating a method of burning a fuel containing sulfur and nitrogen in accordance with another aspect of the present invention.

A technique in accordance with another aspect of the present invention is illustrated in FIG. 9 of the drawings. The system of FIG. 9 is described in connection with the treatment of a normally solid fuel containing high concentrations of $SO_x$ and $NO_x$ precursors, but it should be recognized that normally liquid streams can also be treated. Specifically, a fuel which can be any normally gaseous, normally liquid or normally solid fuel is introduced through line 126 while a combustion supporting material, preferably air, is introduced through line 128 to a combustor 130. The fuel and air are intimately mixed at the upstream end of combustor 130 and the fuel is burned in the presence of the air at a fuel-air equivalence ratio at least equal to the stoichiometric ratio necessary for complete combustion of the fuel, preferably an excess of about 3% oxygen on a dry basis. When burning has taken place in combustor 130, for a residence time sufficient to essentially complete combustion of all of the fuel, the burning step is abruptly terminated by the introduction of a quench fluid, namely, water, through line 132. This abrupt termination of the burning step is carried out in essentially the same manner as previously described in connection with the operation of the two-stage, rich-lean combustor 78 of FIG. 7 and the hydrogen generating combustor 86 of FIG. 8, except that in the present case, water is utilized as a quench fluid, rather than air or the like. Detailed operation of combustor 130 as a steam generator will be discussed in more detail in connection with the description of FIGS. 11-14 of the present application. In any event, the effluent produced by combustor 130, when operated as a steam generator, will comprise primarily steam (62%) and nitrogen (32%), with about 5% carbon dioxide and about 1% oxygen when utilizing a No. 6 fuel as a fuel. As pointed out hereinafter also, the effluent can be discharged at any desired controlled temperature or pressure to thereby provide the necessary temperature and/or pressure for a given reaction. In this particular embodiment, an oxidizing agent such as oxygen, oxygen-enriched air or air is introduced into the effluent of combustor 130 through line 134. Obviously, the air could be supplied as a substantial excess of air over stoichiometric quantities through line 128 but preferably is introduced into the effluent from steam generator 130, subsequent to quenching by water to produce the steam. In any event, the effluent from combustor 130, when operated as a steam generator, is introduced directly into reactor 36, which, in this specific example, is a reactor for desulfurizing coal by an air/steam leaching process. A process of this general character is described in "Coal Cleaning Technology", supra, at pps. 194-202 and is referred to as the ERDA process or variously as The Pittsburg Energy Technology Center (PETC) and Pittsburg Energy Research Center (PERC) process. By way of specific example, coal is ground to approximately −14 mesh to about −200 mesh. It is contacted with air and steam at temperatures of about 300° to 400° F. and pressures of about 500 to 1500 psia for a residence time of one hour or less. At these conditions, essentially all of the mineral sulfur or pyritic sulfur is removed from the coal and approximately 40% of the organic sulfur is removed. The pyritic sulfur is converted to predominantly ferrous sulfate, ferric oxide and sulfuric acid, whereas the organic sulfur is converted to sulfuric acid and hydrocarbons originally present as substituents in the organic sulfur molecules. As schematically shown, in FIG. 9, in accordance with the present invention, the powdered coal is introduced to reactor 136 through line 138, preferably utilizing a part of the air as a transport fluid. Reactor 136 is operated as a fluidized bed utilizing the effluent from combustor 130 as a fluidizing medium. Reaction product is withdrawn through line 140 and passed to a high pressure flash unit 142. In flash unit 142, gaseous components of the product stream are flashed off, through line 144, while solid and liquid components of the product are discharged through line 146. The flashed gases will contain excess hydrogen and therefore can be recycled to the operation through line 146 or discharged as a waste or fuel, through line 148, depending upon the components thereof and their quantity. If the hydrogen content is too low to justify recycle, but the pressure and combustibles of the gas are sufficiently high to justify use as a fuel (since they contain some CO and hydrocarbon gases), such fuel can be recycled and utilized as part of the fuel introduced through line 126 to combustor 130. If flashed gases are not economically utilizable as a hydrogen recycle stream or a fuel, they can be disposed of as a waste. Where hydrogen recycle stream 146 contains sufficient hydrogen to be utilized directly as a recycle stream, without purification, the recycle stream would be passed through line 150 and added to the effluent of combustor 130 or at any other point in combustor 130 or reactor 136 downstream of the combustion termination step. Where it is desired or appropriate to purify the hydrogen recycle stream, the gas would be passed to an appropriate purification unit, such as the pressure swing adsorption unit 154, as previously described. The purified hydrogen is then discharged from PSA unit 154 through line 156 for recycle. Waste gases or contaminants from PSA unit 154 are discharged through line 158 and may be utilized as a fuel, as previously discussed, or disposed of as a waste. If the gases are at a sufficiently high pressure, even though containing insufficient combustibles to be utilized as a fuel, the energy of the gases can be recovered by passing the gas through an expander 160 of an expander-compressor combination and the compressor component 162 utilized to compress the air to combustor 130 or for other appropriate compression needs. The solid-liquid stream passing through line 146, and containing desulfurized coal, an aqueous sulfuric acid phase and solid ferric sulfate is passed to an appropriate thickener 164, where the liquid phase is removed from the coal and is discharged through line 166, while the coal stream is passed through line 168. The coal stream is then filtered in an appropriate filter 170 and the separated liquid is passed through line 172. The liquid phases from line 166 and 172 then pass to a sulfur containing waste treatment unit 174. Waste treatment 174 may be any appropriate conventional treating means for converting the waste stream containing the previously mentioned wastes for recovering sulfur or the like. By way of specific example, the waste stream may be treated with lime to neutralize the sulfuric acid and ferrous sulfate. The sulfuric acid is converted to gypsum and the ferrous sulfate to gypsum and ferrous hydroxide. These reaction products can then be sent to a sludge thickener and subsequently filtered, in a filter such as filter 176. The filter cake from this operation constitues a solid waste which can be appropriately disposed of. The thickener overflow and the filtrate constitute a recycle water which can be sent back to the desulfurizing operation through line 178, with the filter cake disposed of through transport line 180.

Another significant feature of the system of FIG. 9 is that, as previously pointed out, the effluent from combustor 130 contains significant amounts of carbon monoxide and carbon dioxide. Accordingly, if an appropriate alkaline material is introduced through line 180 and combined with the quench water or at any other point downstream in combustor 130 or in reactor 136. These alkaline materials will form carbonates and bicarbonates with carbon monoxide and carbon dioxide, which are known desulfurizing agents for desulfurizing coal. Alternatively, or in addition thereto, the alkaline material can be utilized to neutralize the sulfuric acid in situ in reactor 136. For example, if sodium hydroxide is added, water soluble sodium sulfate will be produced or if calcium hydroxide is added, water insoluble calcium sulfate will be produced in the same manner as the neutralization carried out in waste treating unit 174. It is also known, as previously indicated, that limestone (calcium carbonate), dolomite (magnesium-calcium carbonate), as well as sodium carbonate, are effective materials for the desulfurization of carbonaceous materials, such as coal, at high temperatures and pressures. Consequently, these materials can be introduced as additives through line 180 to further aid desulfurization of the carbonaceous material in reactor 136. Obviously such a combined operation is highly energy efficient by comparison to conventional desulfurization techniques utilizing such additives.

Alternative processes utilizing heat, pressure and/or steam together with alkaline materials include the following.

In one technique, a hot NaOH solution (heat+water or steam from combustor+NaOH) is contacted with −40 to −100 mesh coal to convert the sulfur to soluble sodium sulfide and polysulfides. The coal is then washed to remove the sulfides, the waste water is carbonated to produce $H_2S$ and the sulfur can be recovered by the Claus process. Sodium carbonate plus lime is utilized to regenerate NaOH for recycle and the $CaCO_3$ may be kilned to produce $CO_2$ and lime for reuse. The chemistry of such process is set forth in "Cool Cleaning Technology", supra, at pp. 203–214. Similarly, heat plus water or steam from the combustor plus NaOH and CaOH can be utilized at 400°–650° F. and 250–2500 psig for a residence time of about 10 minutes, preferably, in an oxygen free atmosphere. Regeneration and sulfur recovery is similar to the previous process. See "Coal Cleaning Technology", supra, pp. 215–230, for the chemistry involved. In yet another technique, coal is ground to about −200 mesh and contacted with $Na_2CO_3$ plus $O_2$ at about 250° to 300° F. and a pressure of about 50 psia for about 1 to 1.5 hrs. to oxidize $FeS_2$ to $Fe_2O_3+Na_2SO_4+CO_2+H_2O$. See "Coal Cleaning Technology", supra, pp. 273–287 for details. It is to be recognized that, in these techniques, heat+water or steam, additives and oxidants, when utilized, are to be supplied by discharging the effluent from combustor 130 of FIG. 9 directly into the reactor.

The filtered coal from filter 170 is passed through line 182 to the first stage 184 of a two-stage, rich-lean combustor operated in the same manner as described with respect to FIG. 8, specifically, air is introduced through line 186 and is intimately mixed with the fuel at the upstream end of first stage 184 and the fuel is burned under fuel-rich conditions, which convert fuel nitrogen to nitrogen and thus reduce $NO_x$ pollutant production. The fuel-rich combustion step is abruptly terminated by, at least in part, adding a second volume of air through line 188 to produce a mixture having an over all equivalence ratio in excess of the stoichiometric amount necessary for the complete combustion of the fuel. This mixture is then abruptly expanded into heat utilization unit 190 where combustion is completed under fuel-lean conditions.

A highly effective oxidizing agent, which can be substituted for oxygen, oxygen-enriched air or air, is hydrogen peroxide. However, conventional techniques for the production of hydrogen peroxide are expensive, hydrogen peroxide is difficult to handle and transport and hydrogen peroxide deteriorates rapidly in the presence of water. Consequently, in accordance with yet another aspect of the present invention, combustor 130 of FIG. 9 can be operated as a hydrogen peroxide generator, thereby producing hydrogen peroxide in a relatively inexpensive manner and eliminating the previously mentioned problems of handling and deterioration of hydrogen peroxide, that is, by directly discharging the hydrogen peroxide into the reactor 136. In this specific operation, the hydrogen containing fuel, preferably one having a high hydrogen content, such as natural gas, is introduced through line 126. A combustion supporting material, preferably air, is introduced through line 128 and the fuel and air are intimately mixed at the upstream end of combustor 130. The fuel-air mixture is selected to be fuel-lean and an appropriate residence time is selected to produce maximum quantities of hydrogen peroxide. The burning step is then abruptly terminated by, at least in part, introducing a quench fluid, preferably water through line 132 to thereby prevent destruction of the thus produced hydrogen peroxide and the formation of other materials therefrom. The effluent from combustor 130 is then discharged directly into reactor 136. The hydrogen containing fuel may include any normally gaseous fuels, such as methane, ethane, propane, butane, etc., particularly natural gas, normally liquid fuels, including various petroleum fractions, diesel fuels, fuel oils and crude oils as well as normally solid fuels, preferably ashless fuels, such as asphaltene bottoms, solvent refined coal oils, shale oils, etc., provided only that such fuel is capable of producing hydrogen atoms or perhydroxy radicals when burned. The fuel/air equivalence ratio should be between about 0.1 and 0.6 and, more preferably, between about 0.1 and 0.2 and the residence time should be between about 1 and 10 milliseconds and, preferably, between about 1 and 3 milliseconds. The burning step should also be carried out at relatively high temperature, preferably between about 800° and 1300° F., since at this temperature, the production of hydrogen peroxide is increased at the expense of oxygenated organic materials. The maintenance of a proper temperature in the reactor can also be aided by preheating the air to temperatures between ambient temperature up to about 800° F. Where heavy, normally liquid fuels are utilized, it is also advantageous to preheat the fuel so that it can be readily atomized and mixed with the air. The temperature in the burning step can also be controlled to a certain extent by dilution of the fuel-air mixture with water. This also prevents undesirable side reactions, such as cracking of the hydrocarbons. In addition to hydrogen peroxide, the burning step can produce varying amounts of carbon monoxide, carbon dioxide, hydrogen, water, unsaturated hydrocarbons, organic acids, ketones, aldahydes and alcohols. However, these side products have been found to be reduced if the fuel-air equivalence ratio is maintained substantially below the stoichiometric ratio and the residence time is extremely short, as previously mentioned. Further, these components will not normally interfere with the oxidization of sulfur or other reactions, which can be carried out in the presence of an oxidizing agent. As a matter of fact, as previously pointed out, with respect to the operation of combustor 130 as a steam generator, the carbon dioxide and carbon monoxide content of the effluent can be advantageously utilized in a desulfurization process by adding appropriate additives to the effluent.

Hydrogen for refinery operations and other uses can be conventionally generated by a steam methane reforming operation, which is widely utilized in industry. This technique comprises reforming methane and steam over an appropriate catalyst at about 1500° F. to produce carbon monoxide and hydrogen. This effluent is then passed to a shift converter where more steam is added over another catalyst at about 650° F. to convert the carbon monoxide to carbon dioxide and hydrogen. The resultant effluent from the shift conversion is then purified to remove carbon dioxide, usually by a two-stage absorption operation, utilizing diethanolamine as an absorbent. Purified material is then passed to a methanation step to remove residual amounts of carbon monoxide and carbon dioxide, where the hydrogen stream containing such materials can adversely effect a reaction utilizing the hydrogen. This clean-up step is carried out over yet another catalyst at a temperature of about 800° F. to convert the carbon monoxide and carbon dioxide to methane and water. Thereafter, the effluent from the methanation step is passed to an appropriate flash unit which removes the hydrogen and methane as an overhead and water as a liquid. This process is well known in the art and catalysts and operating conditions are also well known in the art, and, therefore, detailed description thereof is not necessary herein. However, a steam methane reforming operation for the production of hydrogen is a highly energy intensive, expensive process. By contrast, a highly energy efficient, simplified procedure for producing a hydrogen product of high purity is outlined in FIG. 10 of the drawings.

Figure 10:
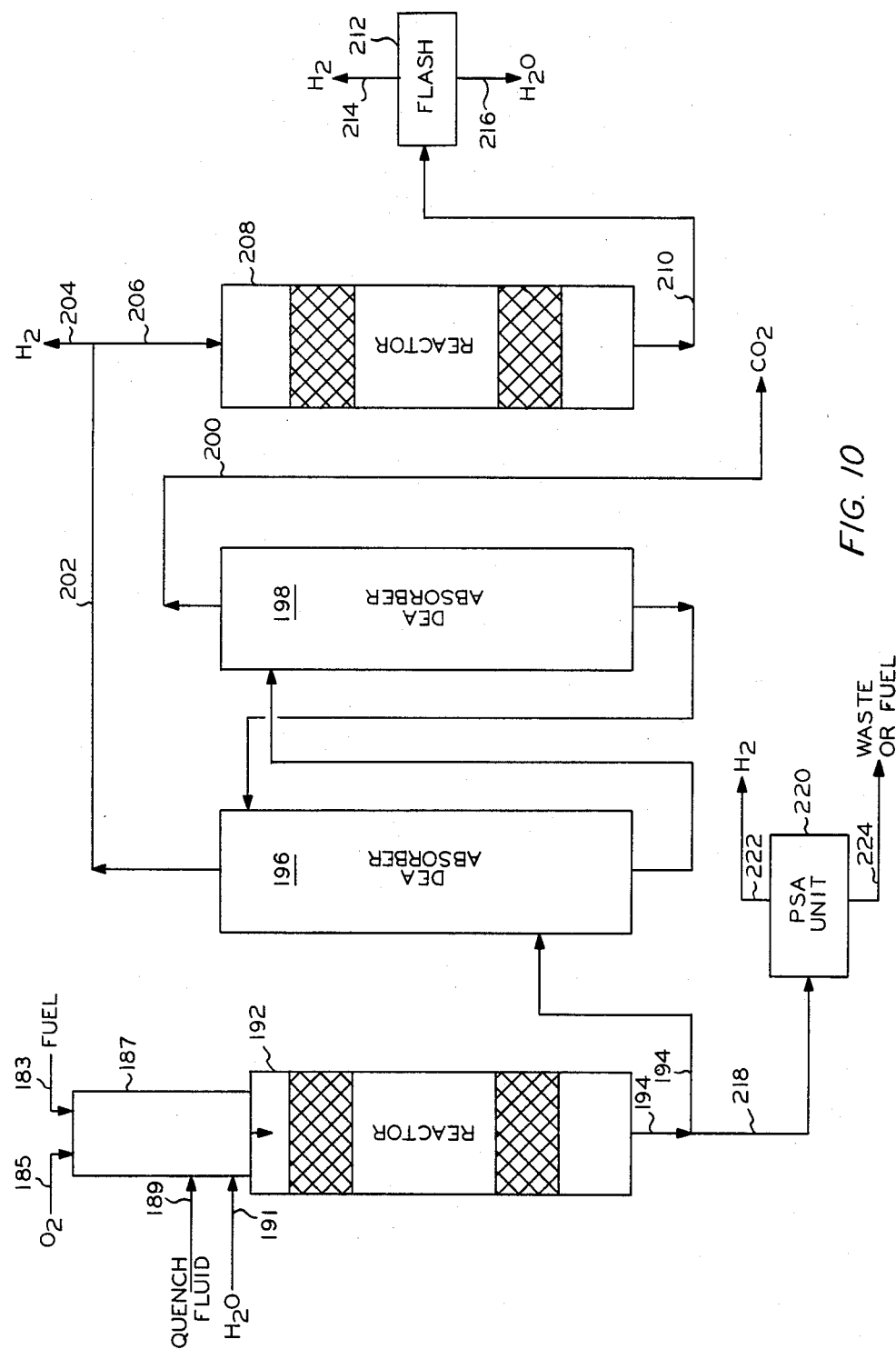
FIG. 10 is a flow diagram illustrating a method for producing hydrogen.

Referring to FIG. 10, a fuel and a combustion supporting material, which may include oxygen, oxygen-enriched air or air, are introduced through lines 183 and 185, respectively to a hydrogen generating combustor 187. Combustor 187 is operated in the same manner as previously described in the operation of combustor 86 of FIG. 8. Specifically, the fuel may be a methane stream (natural gas), propane, or other normally gaseous fuels, naphthas, distillate fuels, such as JP-5, even to the extent of utilizing crude oils. The fuel-air equivalence ratio, as previously indicated, is highly fuel-rich. Also, as previously indicated, after an appropriately short residence time, the burning step is abruptly terminated by, at least in part, introducing a quench fluid such as air or water through line 189. If air is utilized as a quench fluid, then water is preferably introduced through line 191 in combustor 187 downstream from the termination of the burning or into reactor 192. As previously described, hydrogen generator 187 also produces significant amounts of carbon monoxide. Accordingly, the water added to the effluent from combustor 187 will combine with the carbon monoxide in a shift conversion step carried out in reactor 192, wherein the carbon monoxide is converted to carbon dioxide and additional hydrogen. The shift reaction will be carried out in accordance with conventional practice. Accordingly, in accordance with this technique, the production of hydrogen is carried out in a highly energy efficient manner, while eliminating the conventional reforming step and the expense thereof, as well as eliminating the cost of catalysts and the heating, effluent transmission and a certain amount of compression costs connected with operation of the reforming unit. The effluent from shift reactor 192 is discharged through line 194 and is then treated in accordance with conventional practice. Specifically, the effluent from line 194 is passed through a dual diethanolamine absorption system 196 and 198 to remove carbon dioxide and the carbon dioxide is discharged through line 200. A purified hydrogen stream is discharged through line 202. Where small amounts of carbon monoxide and carbon dioxide are not detrimental to the use of the hydrogen stream, the hydrogen may be recovered through line 204 for desulfurization. Where it is desired to remove the residual carbon monoxide and carbon dioxide, the hydrogen stream is passed through line 206 to an appropriate methanation unit 208 where it is conventionally treated to convert the carbon monoxide and carbon dioxide to methane and water. The effluent from methanation unit 208 is passed through line 210 to flash unit 212 where the hydrogen stream is separated and withdrawn through line 214 and the water is discharged through line 216. While this purification technique is effective, it is rather complex and expensive and it is generally ineffective in the removal of nitrogen from the effluent of shift reactor 192. Accordingly, in a preferred embodiment, the effluent from shift converter 192 is passed through line 218 to a pressure swing adsorption unit 220, operated as previously described. The highly purified hydrogen stream for desulfurization is withdrawn through line 222 and contaminant gases are recovered through line 224 and may, as previously explained, be utilized as a fuel or disposed of as a waste.

Figure 11:
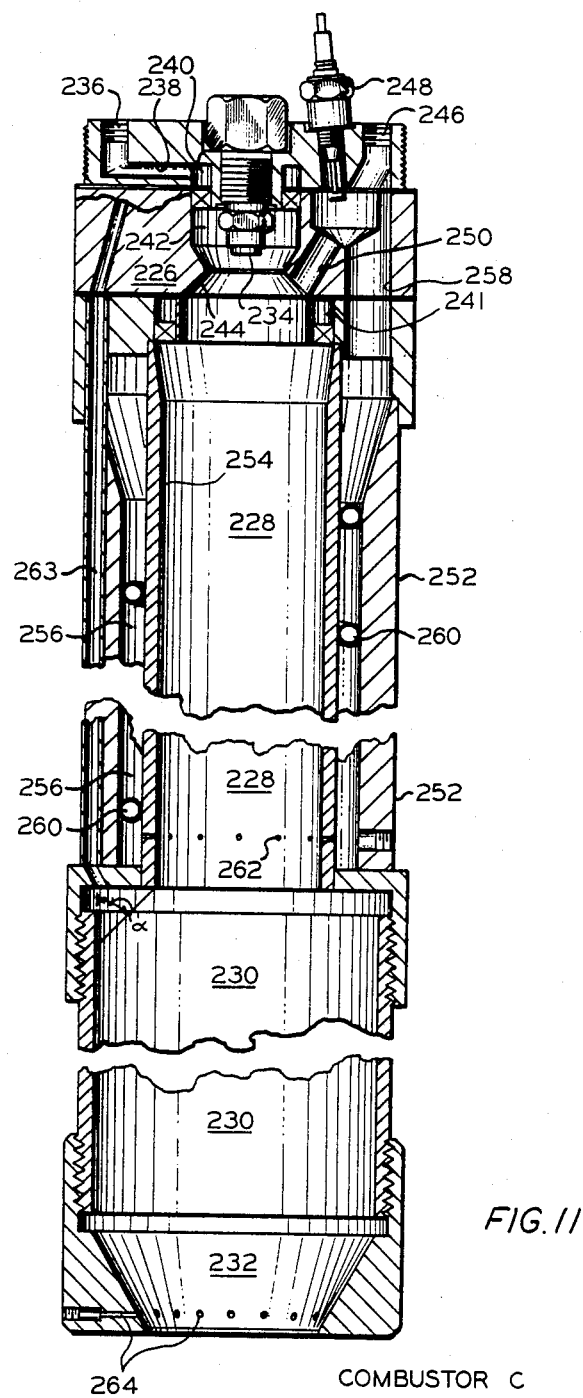
FIG. 11 is an elevational view, partially in cross section, of a burner adapted to produce an effluent containing an oxidizing agent or a reducing agent.

FIG. 11 of the drawings illustrates Combustor C, which is a steam generator useful in accordance with the present invention, which is adapted to supply steam and if desired, maintain a predetermined pressure in a given reaction, providing a steam-air mixture at a high temperature and a high pressure to a process for removing sulfur as shown in FIG. 9.

FIG. 11 of the drawings is a schematic drawing, in cross section, of a basic steam generator. One of the distinct advantages of this steam generator is that it is capable of utilizing any readily available type of fuel, from gaseous fuels to solid fuels, with minor modifications. In general, such modifications involve only replacement of the combustor head, and/or, in some cases, the combustion chamber. Accordingly, it is highly advantageous to attach the head to the main body of the device so that it may be removed and replaced by a head adapted for the use of different types of fuels. In addition, sight glasses could be provided along the body at appropriate points in order to observe the flame, etc. It would also be possible to monitor the character of the mixture of flue gas and steam being injected and therefore, make appropriate adjustments for control of the feed fluids.

The generator comprises four basic sections or modules, namely, a combustor head 226, a combustion chamber 228, a water vaporization chamber 230 and an exhaust nozzle 232. As previously pointed out with respect to the combustor head, all of the modules are connected in a manner such that they are readily separable for the substitution of alternate subunits, servicing, repair, etc. In some cases, however, the combustion chamber 228 and water vaporization chamber 230 can be permanently connected subunits, since the unit can be designed so that these two subunits can be utilized for most types of fuel and most water injection and vaporization rates. In certain instances it may also be desirable to substitute a different exhaust nozzle or a different fuel introduction means. Details of such modifications will be set forth hereinafter.

Air and fuel are brought to the combustor head 226 in near stoichoimetric quantities, generally with 3% excess oxygen on a dry basis. As previously indicated, the fuel can be gases, such as hydrogen, methane, propane, etc., liquid fuels, such as gasoline, kerosene, diesel fuel, heavy fuel oils, crude oil or other liquid hydrocarbon fractions, as well as normally solid fuels, such as solvent refined coal (SCR I), asphaltenes, such as asphaltene bottoms from oil extraction processes, water-fuel emulsions, for "explosive atomization", water-fuel solutions for "disruptive vaporization" of fuel droplets, etc. A fuel introduction means 234 is mounted along the axis of head 226 to introduce fuel centrally and axially into the combustion chamber 228. In the particular instance schematically shown herein, the fuel introduction means 234 is an atomizing nozzle adapted for the introduction of a liquid fuel. Such atomizing nozzles are well known in the art and the details thereof need not be described herein. However, the nozzle may be any variety of spray nozzles or fluid assist nozzles, such as an air assist or steam assist nozzle. Obviously an air assist nozzle, where such assistance is necessary, is preferred if there is no readily available source of steam and to prevent dilution in the combustion chamber, since it would be necessary to recycle a part of the effluent stream to the steam assist nozzle, a more difficult and unnecessary task. In any event, the nozzle 234 sprays the appropriately atomized liquid fuel in a diverging pattern into the combustion chamber 228. Combustion supporting gas, particularly air, could be supplied to individual air plenums, so that the relative volumes of air could be adjusted, rather than depending solely upon the relative open areas of the entries to the combustion chamber, or individual lines to each opening. In either event, a first volume of air is introduced through a plurality of vertically disposed channels 236. From channel 236 the first volume of air flows through tangential channels 238 and thence to annular plenum chamber 240. Passage through the tangential channels 238 imparts a swirling or rotational motion to the air. The rotating air then enters mixing or contact chamber 242 where it begins contact with the fuel exiting from nozzle 234. The fuel exiting from nozzle 234, preferably exits the nozzle in a cone-shaped pattern having an angle, preferably of about 45°. The first volume of air from mixing chamber 238 is reduced in diameter by a baffle or nozzle-type restriction 244. This reduction in diameter of the air aids in the mixing of the combustion air and the fuel which begins at the downstream end of the mixing chamber 242. As the mixture of air and fuel expands into the exit end of mixing chamber 242, a well mixed mixture of fuel and air travels downstream into the combustion chamber 228 as a body of fluids rotating in a counterclockwise direction and moving axially through the combustion chamber. Normally, the larger diameter of combustion chamber 228 as opposed to mixing chamber 242 would cause expansion of the counterclockwise rotating mixture of fuel and air toward the walls of combustion chamber 228. However, in the present case, this is prevented to a great extent by a second volume of air. A second volume of air enters from a common plenum (not shown) through longitudinally disposed bores (not shown) thence through tangential bores (not shown) and into annular plenum 239. These supply channels for the second volume of air are substantially the same constuction and character as those utilized for introducing the first volume of air, with the exception that the channels introducing the second volume of air cause the second volume of air to rotate in a clockwise direction or countercurrent to the direction of rotation of the first volume of air. The second volume of air in traveling downstream through combustion chamber 228 will have a tendency to move toward the axis of combustion chamber 228 and, as previously indicated, the first volume of air will have a tendency to move toward the walls of combustion chamber 228, thus a high velocity shear surface exists between the two countercurrently flowing volumes of fluid and the hottest portion or core of the flame traveling along the axis does not contact the walls of the combustion chamber, thereby preventing burning of the walls and the formation of deposits along the walls, particularly where heavy fuels are utilized. However, the intense mixing which occurs at the interface between the two volumes of fluids does create considerable mixing and by the time the two volumes reach the downstream end of combustion chamber 228, substantially complete mixing has occurred and therefore substantially complete combustion. In addition, the central vortex has also essentially collapsed and a uniform, cross-section or "plug" flow of flue gas exists. Lighting or ignition of the generator is accomplished by supplying a gaseous fuel through channel 246 and air through a channel (not shown), which contact one another adjacent the downstream end of spark plug 248. This burning flame then passes through channel 250 into mixing chamber 242 where it ignites the first volume of air-fuel mixture in mixing chamber 242.

The combustion chamber includes an outer casing 252 and an inner burner wall 254, which form an annular water passage 256 therebetween. Water passage 256 is supplied with water through water conduit 258 and cools the combustion chamber. It should be recognized at this point that transfer of heat from the combustion chamber to the water in passage 256 is not necessary in order to vaporize the water since complete vaporization occurs downstream, as will be pointed out hereinafter. In order to prevent the formation of air bubbles or pockets in the body of cooling water, particularly toward the upper or upstream end of the channel, water swirling means 260 is spirally found in the water channel 256 to direct the water in a spiral axial direction through the channel. The water swirling means 260 can be a simple piece of tubing or any other appropriate means. A primary concern in the operation of the generator is combustion cleanliness, that is the prevention of deposits on the wall of the combustion chamber and production of soot emissions as a result of incomplete combustion. This becomes a particlar problem where heavy fuels are utilized and the problem is aggravated as combustor pressure increases and/or combustion temperature decreases. In any event, the manner of introducing the air into the generator substantially overcomes this problem. The counter rotating streams of air in the combustion chamber provide for flame stabilization in the vortex-flow pattern of the inner swirl with intense fuel-air mixing at the shear interface between the inner and outer streams of air for maximum fuel vaporization. Also, this pattern of air flow causes fuel-lean combustion along the combustion chamber walls to prevent build up of carbonaceous deposits, soot, etc. Following passage of the water through channel 256, the water is injected into the combustion products or flue gases from combustion chamber 228 through appropriate holes or apertures 262. Another extremely important factor, in the operation of the steam generator of the present invention, is the prevention of feedback of excessive amounts of water from the vaporization section 230 into the combustion section 228, because of the chilling effect which such feedback would have on the burning of the soot particles which are produced during high pressure combustion. Such feedback is prevented by the axial displacement of the vortex flow patterns from the counter rotational air flow. Another extremely important factor in the operation of the steam generator is the manner of introduction of water into the flue gas. In accordance with the present invention, such introduction is accomplished by introducing the water as radial jets into the flue gases, such jets preferably penetrating as close as possible to the center of the body of combustion products. The combustion products-water mixture is then abruptly expanded as it enters vaporization chamber 230. Accordingly, substantially complete vaporization will occur and the formation of water droplets or water slugging in the mixture will be eliminated. Abrupt expansion in the present case is meant to include expansion at an angle (alpha) significantly greater than 15°, since expansion at about 15° causes streamline flow or flow along the walls rather than reverse mixing at the expander. By the time the mixture of combustion products and water reach the downstream end of water vaporization chamber 230, substantially complete vaporization is attained. As will be discussed in greater detail hereinafter, exhaust nozzle 232, designed to discharge the combustion product-steam from the generator, controls the pressure of discharge of the mixture. Channel 263 passes through combustor head 226 into vaporization chamber 230 for the insertion of a thermocouple. Additional air inlets may be directed into chamber 230 or nozzle 232 at any point after termination of the combustion, but is preferably through apertures 264 in nozzle 232 immediately adjacent the outlet, in order to take advantage of the expansion into a reactor to aid mixing.

Figure 12:
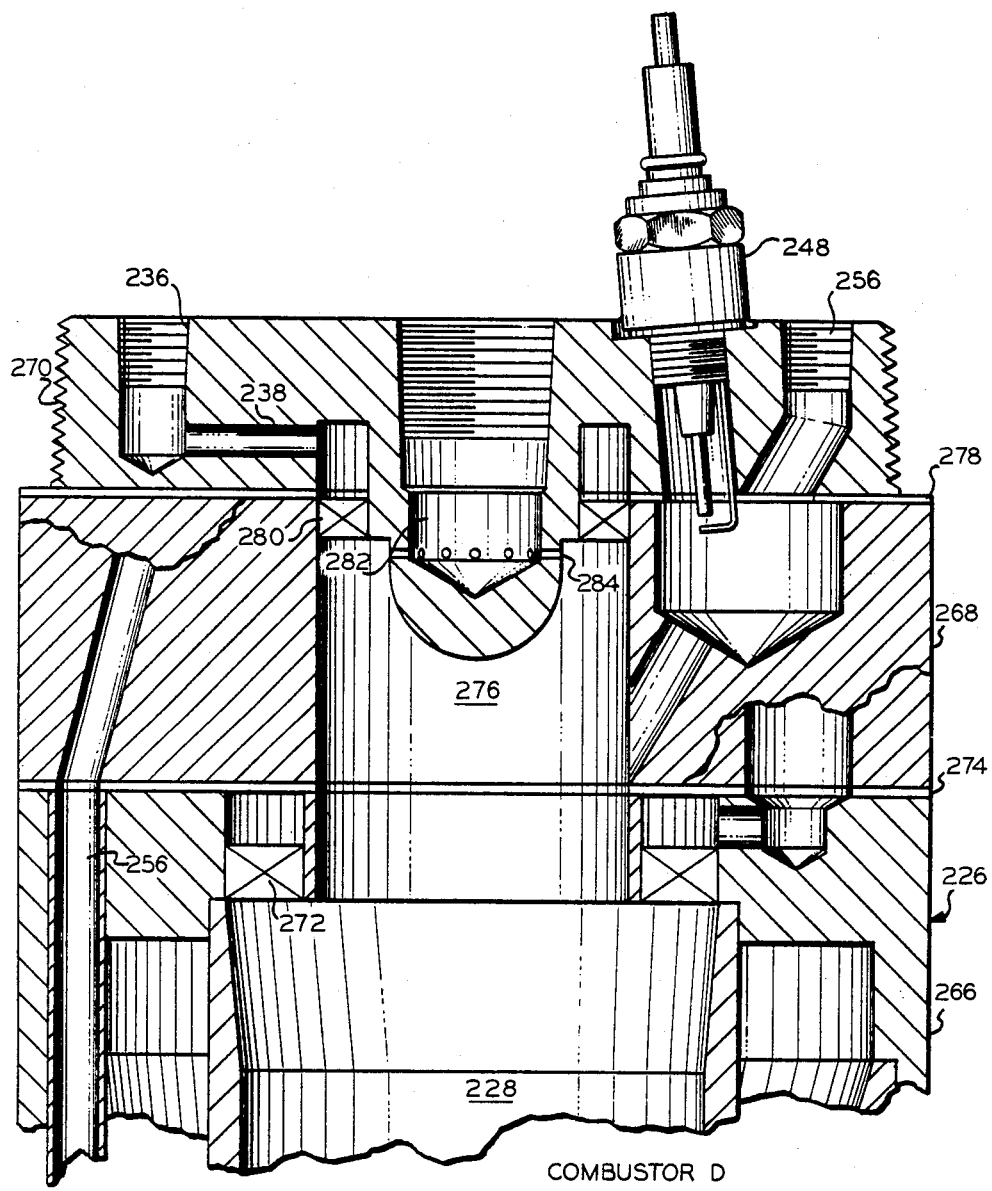
FIG. 12 is an elevational view, partially in cross section, of the upstream end of a modified combustor in accordance with FIG. 11.

FIG. 12 is a partial elevational view of a steam generator, in accordance with the present invention, shown in partial cross section. The particular combustor head shown in FIG. 12 is designed for use of a gaseous fuel, such as natural gas. Primarily, the differences between this and the previously described combustor head lie in the fuel nozzle, the swirlers and the mixing chamber. Appropriate, numbers corresponding to those utilized in FIG. 11 are utilized on corresponding parts in FIG. 12. The adaptability of the generator of the present invention to replacement of modified parts is also discussed in greater detail with relation to FIG. 12.

Referring specifically to Combustor D of FIG. 12, combustor head 226 can be constructed, as shown, in three separate sections, namely, a downstream section 266, a middle section 268 and an upstream section 270. In this particular instance, section 266 is welded to combustion chamber 228. However, as will be pointed out hereinafter, swirler 272, shown schematically, can be readily inserted in downstream section 266 before sections 268 and 270 are attached thereto. An appropriate gasket 274 is mounted between downstream section 226 and middle section 268 and section 268 is mounted on section 266 by means of appropriate threaded bolts. Section 266, as is obvious, also has formed therein the downstream end of a modified mixing chamber 276. This downstream portion of mixing section 276 is the same as the downstream mixing portion of mixing chamber 242 of FIG. 11 and, therefore, section 266 need not be modified except for the swirler in order to substitute corresponding parts of the device of FIG. 11 and provide a modified mixing chamber 276. Mixing chamber 276 of FIG. 12 does not contain the restriction means 244 of FIG. 11, since a gaseous fuel is utilized in FIG. 12 and complete mixing can be obtained with the air without the use of restriction 244 (FIG. 11). Section 270 of the combustor head 226 is similarly attached to section 268 through a gasket 278 therebetween. A modified swirler 280, shown schematically, is similar to swirler 272 and can be readily mounted in section 268 prior to the attachment of section 270. Section 270 has mounted axially therein a modified nozzle 282. Since a gaseous fuel is to be utilized in the present burner, a simple nozzle 282 with apertures 284 radiating therefrom and feeding gaseous fuel into mixing chamber 276 can be utilized. It is also obvious that either nozzle 234 of FIG. 11 or nozzle 282 of FIG. 12 can be threadedly mounted in section 270, thereby requiring only replacement of the nozzle if desired. A torch igniter, as shown, may be utilized in this embodiment or a simple electrode or spark plug. Section 270 contains the same air channels 236 and 238 as the combustion head of FIG. 11, but it is not necessary that tangential channels 238 be utilized. It is to be noted that the swirlers 272 and 280 can include a simple internal ring with blades or fins radiating therefrom and at an appropriate angle. In the present case, the angle of the blades is 45°. Accordingly, the ring serves the same purpose as the tangential channels of FIG. 11. In addition, these rings can be simply mounted in Sections 266 and 268 in combustor head 226 prior to the assembly thereof. As previously indicated, when utilizing the swirler rings, the tangential air introduction is not necessary, but may be retained for convenience of manufacture without adversely affecting the operation of the device. In any event, the swirlers 280 and 272 introduce the first and second volumes of air, respectively, in a rotating, axial direction toward the downstream end of a combustor and in a counterrotative direction. In yet another embodiment of a combustor head, for use in accordance with the present invention, the combustor head can be adapted to burn solid, ashless fuels, such as solvent refined coal (SCR I) and asphaltene bottoms from oil extraction processes, etc. These fuels have melting points above about 250° F. and are, therefore solids at the temperature of introduction to the generator. Fuel would be pulverized to a suitable fineness and fed to the generator dispersed in a suitable carrier fluid, usually a portion of the air. The fuel can be introduced to the combustor head by a simple, straight pipe. Since such solid fuels often become tacky as they approach their melting points, the introduction means is open without constrictions of any kind on the downstream end thereof. Also, because of the tendency of such fuels to become tacky and therefore stick to hot surfaces, causing fouling and eventual plugging, the tip of the introduction means is cooled to prevent build up of the solid fuel on the inner surfaces of the tip and the plugging thereof. Such cooling is conveniently carried out by taking a small side stream of water from the water introduction means and passing the same through an annular passage surrounding the introduction means and returning the same through an annular passage back to the water introduction means. Flow of the water through the cooling jacket can be appropriately controlled, as by means of one-way valves.

Up to this point combustor heads adapted to operate on fuels ranging from gaseous-to-liquid-to-solid have been described. Since complete combustion of a fuel requires an increased residence time the heavier or more difficult to burn the fuel becomes, gases normally require the lowest residence time, light liquids next, heavy liquids still higher and normally solid fuels the highest. Several alternatives are available within the scope of the present invention. As previously indicated, the steam generator of the present invention is modular and combustion chambers of sufficient length to provide the necessary residence time for the fuel to be utilized can be substituted in the generator. Alternatively, a single combustion chamber having a sufficient length to provide adequate residence time for complete combustion of the heaviest fuel to be utilized, for example, crude oil or normally solid fuels, can be utilized and the same combustion chamber utilized for all fuels contemplated. It is to be recognized, of course, in this case, that the combustion chamber would be longer than necessary for the lighter fuels.

A shorter combustion chamber and/or the same length combustion chamber for heavier fuels can also be utilized by placing at least one diametric restriction in the combustion chamber. The restriction means may be simple orifice plates adapted to reduce the diameter of the combustion chamber and thereafter abruptly expand the fluids into the portion of the combustion chamber downstream of the orifice. Restriction means, tapered at their upstream ends in order to eliminate sharp corners where deposits can collect, can also be used. This promotes more complete utilization of the air and more complete combustion. Rotational motion occurs toward the walls thence back toward the center of the flame and also serves to cool the downstream side of the orifice means thus preventing deposit formation thereon and further serves to prevent excessive backflow from the downstream side of the orifice to the upstream side. While the size of the orifice will vary, depending upon the degree of mixing with the air film on the walls of the combustion chamber and the nature of the fuel, the size can be readily optimized experimentally to minimize pressure drop while achieving complete combustion. For example, however, where a No. 2 fuel oil is to be burned, an orifice creating a 30% reduction in open area could be utilized and the orifice mounted about half way down the combustion zone. Since the external dimension of the generator described is about six inches, the combustion chamber is made of metal and is cooled with water in order to prevent internal burning and the formation of deposits on the interior of the combustion chamber. However, with a larger diameter, the combustion chamber can also comprise an outer metal casing, an internal ceramic lining and an insulating blanket wrapped around the ceramic liner between the ceramic liner and the metal casing. The ceramic liner alleviates burning of the interior of the combustion chamber or burner deposit problems, encountered when utilizing a metallic combustion chamber. The insulating blanket protects the metal outer wall from excessive heating.

To attain efficient operation, the design and operation of the unit should be at the design combustion chamber flow velocity and the design vaporization chamber flow velocity, which in turn produce the design output pressure of the unit. If the combustion chamber is operated at the design flow velocity, sufficient residence time in the combustion chamber is provided to vaporize and/or, assuming, of course, that the fuel/air ratio is maintained for stoichiometric operation, for example 3% excess $O_2$ on a dry basis, burn a given fuel. Operation at a higher combustion chamber flow velocity results in incomplete combustion, accompanied by excessive deposits in the burner, excessive carbon particles in the output fluids and possible flame out. Operation at a lower combustion chamber flow velocity results in a reduced heat output below the design heat output of the burner. Similarly, if the vaporization chamber is operated at the design flow velocity, sufficient residence time is provided in the vaporization chamber to essentially completely vaporize the water. On the other hand, operation of the vaporization chamber at a higher flow velocity reduces water evaporation efficiency and uniformity of the temperature distribution at the outlet, and operation of the steam generator at a lower velocity reduces steam generation below the design steam output. The design flow velocities in the combustion chamber and the vaporization chamber (and in turn the design output pressure) are, in turn, determined by the fuel and air flow rates and the water flow rate, respectively.

As previously indicated, air and fuel flow, and consequently, the air-fuel ratio, can be controlled to maintain proper stoichiometry for clean combustion. However, even with control over the stoichiometry and adjustment of air and fuel flow rates to maintain the design point residence time in the combustor, the performance of the combustor could vary because of the back pressure in the reactor unit. Consequently, it is desirable to control the pressure in the generator to at all times maintain the pressure at or near the design point pressure. This is accomplished in accordance with the present invention by variations of the outlet nozzle 232 of the generator.

The nozzle 232, attached to the downstream end of the vaporization chamber, is a major factor in the control of the generator. In order to effect such control, a pressure sensor is disposed in the downstream end of the vaporization chamber and is connected to a line which transmits the sensed pressure to a control location. In the embodiment illustrated, in FIG. 13 the nozzle 232 is formed by reducing the diameter of the flowing fluids by converging the wall 286 to form a reduced diameter section or vena contracta 288 and thereafter diverging the wall 290. In order to prevent interference of the nozzle with the flow of fluids, the angle of divergence of wall 286, is preferably below about 30° and the angle of divergence of the wall 290 is preferably below about 15°. However, it should be recognized that other appropriate openings may be utilized. When the fluids are discharged through nozzle 232 an extension 292 is provided at the downstream end of the nozzle for attachment of the hereinafter mentioned valve. The extension 292 has formed therein a plurality of openings 294 about the periphery for the discharge of fluids from the burner. At least one operating fluid opening 296 is connected to a source of a pressurized operating fluid at the control location.

The pressure control means comprises a plug means 298, a connector or stem 300 and a piston 302 mounted in the piston chamber 304. Plug 298 is a cone shaped plug contoured to prevent flow separation and cavitation. Such cavitation obviously will pit and wear away the solid surfaces of the plug and such erosion will be aggravated by high pressures and temperatures. In order to prevent such cavitation, it has been determined that the slope of the cone should be less than about 30° with respect to a vertical line from the periphery of the base. The piston 302 is also designed to withstand the severe conditions. For this purpose, piston 302 is formed of a plurality of disc-type segments 306 detachably coupled together to form the overall piston. A reduced diameter shoulder 308 is formed on one end of the disc-shaped segments so that when the segments are assembled to form piston 302, a plurality of annular channels will be formed about the periphery of the piston to receive a plurality of sealing rings 310. Thus, the segmented construction of piston 302 not only facilitates assembly and insertion of the annular sealing ring 310, but permits servicing to replace the sealing rings. Piston chamber 304 is detachably coupled to extension 292 of nozzle 232 and, because of its spacing from the end of nozzle 232, forms peripherally disposed openings 294 through which the fluids from the generator are discharged to the outside of the generator. Stem 300 passes through a central aperture in the upstream end of piston chamber 304 and moves therethrough in fluid tight relationship as a result of the mounting of annular seal 312 between the stem and the opening. Seal 312 is held in place by means of detachably mounted ring 314, thus again aiding assembly and servicing of the unit. Similarly, the downstream end of piston chamber 304 is closed by a detachable closure plate 316 with sealing gasket 318 therebetween. Plug 298 is also detachably mounted on piston 302 to facilitate assembly and servicing. In the particular instance shown, the pressure controller is operated by the injection of an operating fluid under pressure through aperture 296 into the void space at the downstream end of the piston chamber. The void space in the upstream end of piston chamber 304 is provided with at least one pressure relief hole 320. Thus, a single acting piston is shown. However, it is also obvious that a double acting piston can be utilized by injecting and withdrawing fluids from the void spaces at both the upstream end and the downstream end of the piston chamber.

The pressure fluid thus moves piston 302 toward and away from the nozzle at the lower end of the vaporization chamber, thus varying the annular space between plug 298 and diverging wall 290, thereby varying the volume of fluid discharged from the vaporization chamber and varying the pressure within the generator and of discharge from the generator. Fluids flowing from the generator also act against plug 298. Accordingly, accurate and complete control of the pressure within the generator and of the discharged fluids can be maintained.

Figure 13:
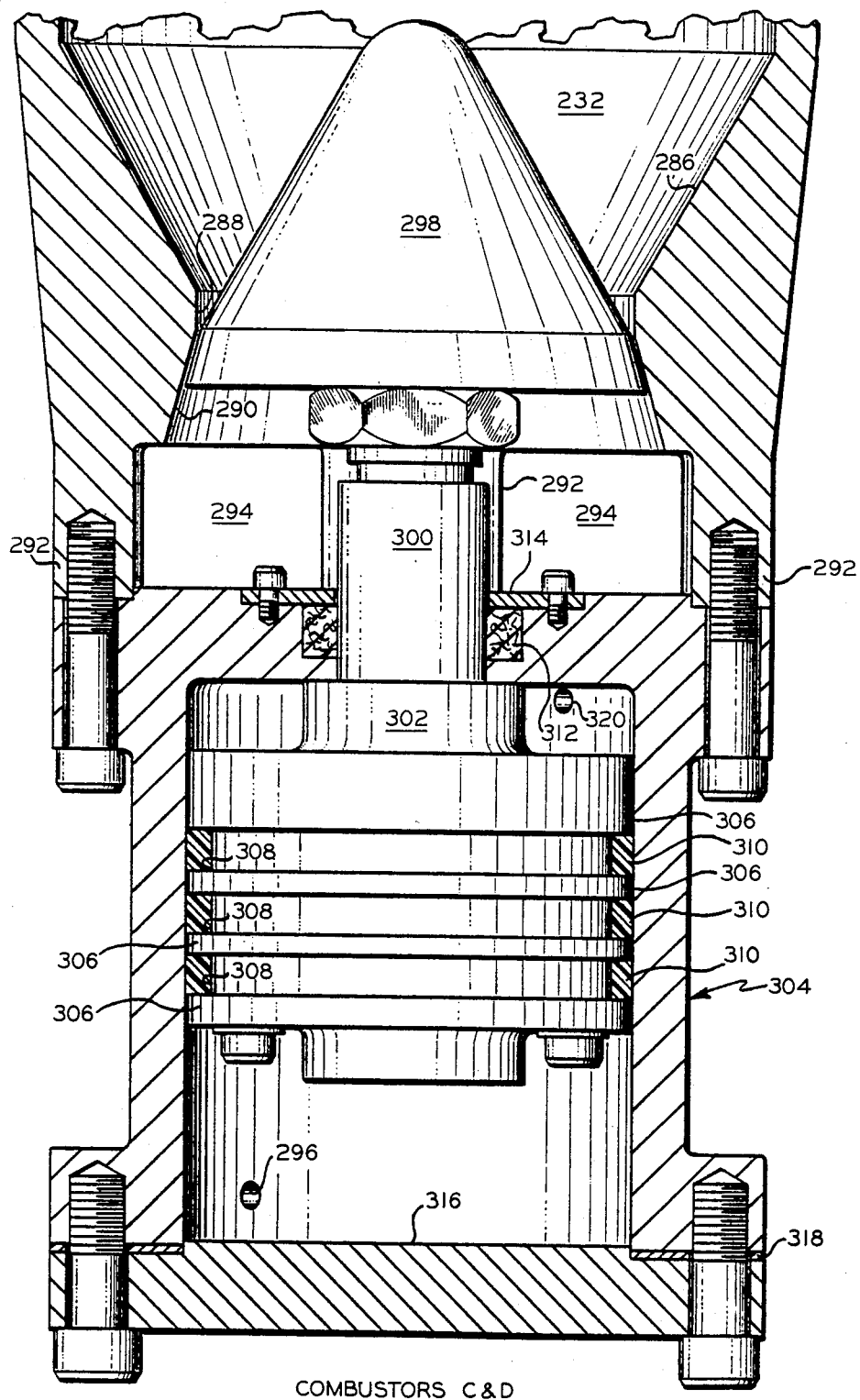
FIG. 13 is an elevational view, partially in cross section, of the downstream end of a modified combustor in accordance with FIG. 11 or 12.
Figure 14:
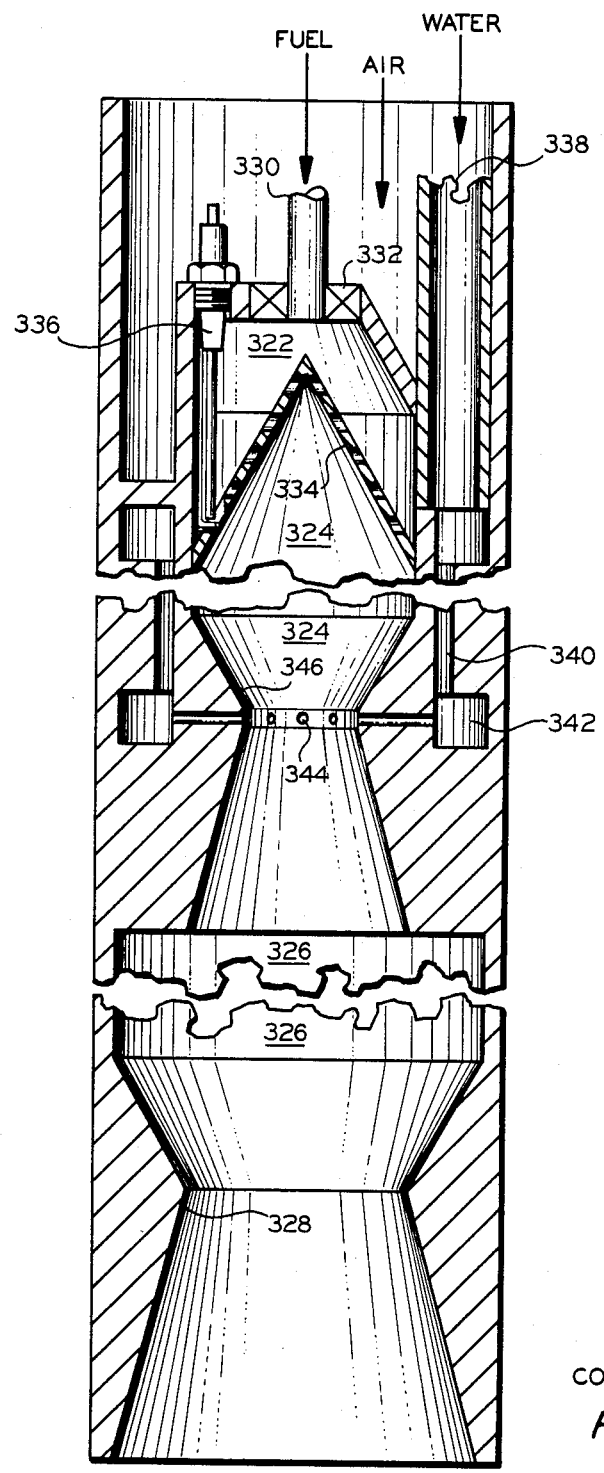
FIG. 14 is an elevational view, partially in cross section, of another burner adapted to produce an effluent containing an oxidizing agent or a reducing agent.

The pressure control means of FIG. 13 can be utilized on the burners shown in FIGS. 11, 12 and 14, or any modification thereof, in order to control the pressure within the reactor into which the burner effluent is discharged.

It is also obvious that the temperature of the reactor may be maintained by the volume and/or temperature of the quench fluid or fluids added after quench.

The following specific example sets forth the basic design of a steam generator, as illustrated in FIG. 11, which was built to burn a fuel oil (ASTM D396 No. 6).

Basically, the steam generator comprised a modular unit having the following modules detachably coupled in series. A combustor head having a centrally mounted, air-blast atomizer adapted to produce fuel droplets of 70 μm Sauter mean diameter (SMD), or less; air introduction means to the combustor comprising concentric, counter rotating, annular swirlers to create an axial, torroidal vortex to serve as a flame holder, and to provide a strong shear surface between counter rotating air streams to prevent fuel penetration to the wall of the combustor; a combustor chamber of standard 3-inch diameter pipe, which is cooled by the water to be eventually injected into the hot flue gas as the outlet end of the combustion chamber; and means for the radial injection of water into the flue gas from the cooling jacket comprising twelve uniformly spaced holes, 0.0625 inches in diameter, the holes are placed at the outlet end of the combustor; a vaporizer chamber of standard 5-inch diameter pipe; and an exhaust nozzle to maintain pressure in the unit.

The atomizer selected was a Delavan swirl-air combustion nozzle (Delavan Mfg. Co., West Des Moines, Ia.), since such an air blast atomizer offers significant advantages in achieving a fine, uniform spray of a broad range of fuels from distillates to heavy crude oils. The nozzle also is small in size (1" diameter and 2.6" long) making it well suited for the steam generator. The rated fuel flow was 50 gal/hr. which produced a power output of 7.59 MM Btu/hr. when operating with a typical No. 6 fuel oil. The following Table 1 illustrates typical values for the atomizer:

TABLE 1
FUEL ATOMIZER

| | |
|---|---|
| Fuel Flow Rate = | 50 gal/h |
| Calorific Value = | 18,330 Btu/lb |
| Power Output = | 7.59 MMBtu/h |
| Fuel Viscosity = | 3 cSt @ 350° F. |
| Droplet Size = | 70 μm Sauter Mean Diameter |
| Evaporation Time = | 7 ms @ 300 psi & 900° F. |

The combustor chamber was designed to operate with an overall stoichiometry of 3% excess oxygen, on a dry basis, to achieve complete and clean burning. Plug flow velocity, at flame temperature, will be maintained at about 177 ft. per second. Consequently, the length of the combustor section required for vaporization of the fuel in question was 15 inches. Characteristic residence time of gases in a combustor of this type is 10 milliseconds. Since light distillates were to be burned, the rate controlling step was based upon chemical reaction kinetics. Using this value, the length required for combustion of the vaporized heavy fuel oil was 21 inches. Therefore, to accomplish both fuel vaporization and combustion, a combustion chamber length of 36 inches was provided. Based on the established power output and the combustor volume, the resulting heat release rate for the combustor was 49 MM Btu/hr.ft$^3$. Normalizing for pressure, this is a heat release rate of 2.3 MM Btu/hr.ft$^3$.atm. The following Table 2 presents the operating characteristics of the combustion chamber.

TABLE 2
COMBUSTOR

| | |
|---|---|
| Oxygen in Exhaust Gas = | 3.00 volume % (Dry) |
| Fuel/Air Ratio = | 0.0635 lb/lb |
| Air Flow Rate = | 1.81 lb/s |
| Combustor Pressure = | 300 psi |
| Inlet-Air Temperature = | 800° F. |
| Flame Tube = | 3 in Pipe |
| Flow Velocity = | 177 ft/s @ 3800° F. |
| Length for Vaporization = | 15 in |
| Combustion time = | 10 ms |
| Length for Combustion = | 21 in |
| Combustor Length = | 36 in |
| Heat Release Rate = | 49 MMBtu/hr . ft$^3$ |

In the design of the vaporizer chamber, a flue gas-steam outlet temperature of 500° F. was selected, which is 78° F. superheat. This required a water flow rate of 706 gal/hr. Other exhaust gas temperatures and steam qualities can be obtained by simply adjusting the water flow rate. Assuming plug flow in the vaporizer chamber, the average velocity was about 107 ft. per second. With the water atomized to approximately 300 μm SMD and in the environment anticipated, it was estimated that a water droplet will evaporate in 20 ms. Using these values, the length required for the complete vaporization of the water was 26 inches.

TABLE 3
VAPORIZER

| | |
|---|---|
| Exhaust-Gas Temperature = | 500° F. |
| Steam Quality = | 78° Superheat |
| Water Flow Rate = | 706 gal/h |
| Vaporizer Tube = | 5 in Pipe |
| Flow Velocity = | 107 ft/s |
| Droplet Size = | 300 μm Sauter Mean Diameter |
| Evaporation Time = | 20 ms @ 300 psi & 500° F. |
| Vaporizer Length = | 26 in |

Accordingly, the overall length of the steam generator was about 6 feet with a maximum diameter of 6 inches. Based on the operating and design variables for the steam generator, the effluent can generally be described as follows. The volume of flue gas plus steam is about 5.1 ft$^3$/sec. at 300 psi and 500° F. The composition of the effluent is primarily steam (62%) and nitrogen (32%), with some carbon dioxide (5% and oxygen (1%), and trace quantities of sulfur dioxide and nitrogen oxides. This composition would not be altered significantly by operation of the steam generator on other hydrocarbon type fuels. The characteristics of the mixture of flue gas and steam from the steam generator is summarized in the following Table 4:

TABLE 4
EXHAUST GAS

| | |
|---|---|
| Volume = | 5.1 ft$^3$/s @ 300 psi & 500° F. |
| Composition | |
| Water = | 61.78 volume % |
| Nitrogen = | 31.70 |
| Carbon Dioxide = | 5.31 |
| Oxygen = | 1.15 |
| Sulfur Dioxide = | 0.04 (1.93 wt % S in Fuel) |
| Nitrogen Oxides = | 0.02 (0.28 wt % N in Fuel) |
| | 100.00 |

While the conditions for the operation of the combustors of FIGS. 11, 12 and 13 have been described for the generation of steam, it is to be understood that these combustors can be operated under conditions adapted to produce a reducing agent, such as H$_2$, or an oxidizing agent, such as H$_2$O$_2$, with or without steam.

FIG. 14 of the drawings illustrates another structure of a steam, hydrogen or hydrogen peroxide generator, which can be used in accordance with the present invention. The apparatus of FIG. 14 is designed for the use of a normally gaseous fuel. The apparatus basically comprises a mixing zone 322, a combustion zone 324, a quench or cooling chamber 326 and a discharge nozzle 328. Fuel is introduced through fuel introduction 330, as a generally axial stream, into mixing zone 322. Air is introduced into the mixing zone 322 through an appropriate swirl means 332. Swirl means 332 can be any of the well known means for creating a swirling annular stream of air, such as an annular ring with fins at appropriate angles, a plurality of peripheral, tangential introduction ports or the like. The fuel and air are partially mixed in mixing zone 322 and are then passed through barrier means 334. Barrier means 334 is a suitable perforated grid, which together with the axial introduction of the fuel and the annular introduction of the air creates an annularly stratified body of fluids, which is fuel-rich along the axis of combustion zone 324 and fuel-lean adjacent the walls of combustion zone 324. Such stratification prevents the body of fluids from reaching equilibrium oxygen atom concentrations before reaching the quench zone. In addition, the grid absorbs heat and prevents flashback of the flame into fuel-air mixing zone 322. Additionally, this stabilizes the flame in combustion zone 324 at the very high flow velocities employed in accordance with the present invention. Grid 334 also increases the flow velocity. The generator of FIG. 14 is designed for the use of natural gas as a fuel and accordingly, combustion zone 324 is approximately 3 inches in length and 3 inches in diameter to attain a residence time of about 1 to 3 ms. Ignition of the fuel-air mixture is affected by spark plug 336. Quench fluid, in the case illustrated water, is introduced through line 338, passes through annular chamber 340 in indirect heat exchange with the combustion zone, thence, into annular plennum 342 and finally is introduced into the flame front through a plurality of peripherally spaced apertures 344. Utilization of the quench fluid in indirect heat exchange with the combustion zone 324, at least in part, permits the utilization of a metal combustion chamber as opposed to a ceramic lined combustion chamber. A ceramic lined chamber would be easily fractured under the conditions employed in accordance with the present invention. In addition, the use of a metallic combustion chamber permits one to construct a generator having a relatively small diameter, in the case illustrated about six inches in diameter. In the apparatus shown, the quench fluid in passing into the flame front as a plurality of radial jets, aids in the mixing of the quench fluid with the flame front and thus the abrupt termination of the reaction. In addition, the quench fluid is injected in the vena contracta of a nozzle 346. Nozzle 346 serves to reduce the diameter of the flame front and thereafter expand the same. This reduction and abrupt expansion aid the mixing of the quench fluid with the flame front and also prevents back flow of the quench fluid into the combustion zone. It should be recognized that the quench fluid can be introduced immediately before or immediately after the vena contracta. It should also be recognized that the angle of expansion can be varied within certain limits. A cooled or quenched effluent is then passed to chamber 326 of suitable dimensions to permit the mixture to achieve a product of uniform composition and velocity. Exhaust nozzle 328 may not be necessary in all cases, since its primary function is to produce a product of uniform composition and velocity. However, nozzle 328 could serve as a mixing nozzle for the addition of chemicals or the introduction of additional fluids by introducing the chemicals or fluids immediately before, into, or immediately after the vena contracta of the nozzle 328.

It is also possible to construct the generator so as to have a larger diameter. In this instance, the generator can be designed without indirect cooling by the quench fluid and instead utilizing a conventional blanket-type insulation. It is also possible in this case to utilize a ceramic lined combustion zone.

While specific materials, items of equipment and assemblages of items of equipment have been referred to herein, it is to be understood that such references are by way of illustration and to disclose the best mode of operation, and are not to be considered limiting.

That which is claimed is:

1. A method for minimizing the production of $SO_x$ and $NO_x$ in the burning of a primary fuel containing significant amounts of $SO_x$ and $NO_x$ precursors, comprising:
   (a) burning an auxiliary fuel in the presence of a combustion supporting material, sufficient to supply oxygen in an amount greater than the stoichiometric amount necessary to burn all of said auxiliary fuel, and for a residence time sufficient to produce significant amounts of hydrogen and abruptly terminating said step of burning said auxiliary fuel, before significant amounts of other products are formed from the thus produced hydrogen, to produce an auxiliary fuel effluent containing significant amounts of hydrogen;
   (b) contacting said primary fuel with said auxiliary effluent in a hydrodesulfurization step, under conditions sufficient to remove significant amounts of $SO_x$ precursors from said primary fuel but insufficient to remove significant amounts of said $NO_x$ precursors from said primary fuel, to produce a primary fuel containing significant amounts of $NO_x$ precursors and reduced amounts of $SO_x$ precursors;
   (c) carrying out fuel-rich combustion by burning the thus hydrodesulfurized primary fuel in a combustion zone in the presence of a combustion supporting material, sufficient to supply oxygen in an amount less than the stoichiometric amount necessary to burn all of said primary fuel, and for a residence time sufficient to convert a major portion of said $NO_x$ precursors to $N_2$, to produce an effluent containing significant amounts of $N_2$ and unburned and partially burned fuel;
   (d) abruptly terminating said fuel-rich combustion and initiating fuel-lean combustion; and
   (e) carrying out fuel-lean combustion of said effluent containing significant amounts of unburned and partially burned fuel by burning said effluent in the presence of an additional amount of combustion supporting material, sufficient to supply oxygen in an amount sufficient to provide an overall amount of oxygen at least as great as the stoichiometric amount necessary to burn all of said primary fuel, and for a residence time sufficient to essentially complete the combustion of said primary fuel, to produce a flue gas predominating in $N_2$ and $CO_2$ and containing substantially reduced amounts of $SO_x$ and $NO_x$.

2. A method for minimizing the production of $SO_x$ and $NO_x$ in the burning of a primary fuel containing significant amounts of $SO_x$ and $NO_x$ precursors, comprising:
   (a) burning an auxiliary fuel in the presence of a combustion supporting material to produce an auxiliary fuel effluent;
   (b) contacting said primary fuel with said auxiliary fuel effluent in the presence of an oxidizing agent, produced by at least one of the steps of producing an oxidizing agent during the step of burning the auxiliary fuel, adding an oxidizing agent during the step of burning the auxiliary fuel, utilizing an oxidizing agent to terminate the step of burning the auxiliary fuel, adding an oxidizing agent to the effluent from the step of burning the auxiliary fuel and adding an oxidizing agent to said step of contacting said primary fuel with said auxiliary fuel effluent, under conditions sufficient to remove significant amounts of $SO_x$ precursors from said primary fuel but insufficient to remove significant amounts of said $NO_x$ precursors from said primary fuel, to produce a primary fuel containing significant amounts of $NO_x$ precursors and reduced amounts of $SO_x$ precursors;
   (c) carrying out fuel-rich combustion by burning the thus contacted primary fuel in a combustion zone in the presence of a combustion supporting material, sufficient to supply oxygen in an amount less than the stoichiometric amount necessary to burn all of said primary fuel, and for a residence time sufficient to convert a major portion of said $NO_x$ precursors to $N_2$, to produce a effluent containing significant amounts of $N_2$ and unburned and partially burned fuel;
   (d) abruptly terminating said fuel-rich combustion and initiating fuel-lean combustion; and
   (e) carrying out fuel-lean combustion of said effluent containing significant amounts of unburned and partially burned fuel by burning said effluent in the presence of an additional amount of combustion supporting material, sufficient to supply oxygen in an amount sufficient to provide an overall amount of oxygen at least as great as the stoichiometric amount necessary to burn all of said primary fuel, and for a residence time sufficient to essentially complete the combustion of said primary fuel, to produce a flue gas predominating in $N_2$ and $CO_2$ and containing substantially reduced amounts of $SO_x$ and $NO_x$.

3. A method in accordance with claim 2 wherein the step of contacting primary fuel to remove $SO_x$ precursors is carried out in the presence of water supplied by at least one of the steps of adding water to the step of burning the auxiliary fuel, utilizing water to terminate the step of burning the auxiliary fuel, adding water to the effluent from the step of burning the auxiliary fuel and adding water to the step of contacting the primary fuel to remove $SO_x$ precursors.

4. A method in accordance with claim 3 wherein the step of contacting the primary fuel to remove $SO_x$ precursors is carried out in the presence of an alkaline material.

5. A method in accordance with claim 4 wherein the alkaline material is an alkaline carbonate.

6. A method in accordance with claim 5 wherein the alkaline carbonate is sodium carbonate.

7. A method in accordance with claim 4 wherein the alkaline material is a material adapted to form carbonates by a reaction with $CO_2$.

8. A method in accordance with claim 2 wherein the oxidizing agent is hydrogen peroxide.

9. A method in accordance with claim 8 wherein the hydrogen peroxide is produced during the step of burning the auxiliary fuel by burning said auxiliary fuel in the presence of a combustion-supporting material, sufficient to supply oxygen in an amount significantly greater than the stoichiometric amount necessary to burn all of said auxiliary fuel, and produce an effluent containing significant amounts of hydrogen peroxide, abruptly terminating the step of burning the auxiliary fuel, before significant amounts of hydrogen peroxide form other products.

10. A method in accordance with claim 9 wherein the step of contacting the primary fuel to remove $SO_x$ precursors is carried out in the presence of water supplied by at least one of the steps of adding water to the step of burning the auxiliary fuel, utilizing water to terminate the step of burning the auxiliary fuel, adding water to the effluent of the step of burning the auxiliary fuel and adding water to the step of contacting the primary fuel to remove $SO_x$ precursors.

11. A method in accordance with claim 1 wherein the step of contacting the primary fuel to remove $SO_x$ precursors is carried out in the presence of an alkaline material.

12. A method in accordance with claim 11 wherein the alkaline material is an alkaline carbonate.

13. A method in accordance with claim 12 wherein the alkaline carbonate is sodium carbonate.

14. A method in accordance with claim 11 wherein the alkaline material is adapted to form carbonates by a reaction with $CO_2$.

15. A method in accordance with claim 1 wherein a normally gaseous off-gas is separated from the effluent of the step of contacting the primary fuel to remove $SO_x$ precursors and at least a part of said off-gas is recycled to said step of contacting the primary fuel to remove $SO_x$ precursors.

16. A method in accordance with claim 1 wherein a normally gaseous off-gas is separated from the effluent of the step of contacting the primary fuel to remove $SO_x$ precursors, the step of burning the auxiliary fuel is a two-stage, rich-lean burning step and at least a part of said off-gas is burned in said two-stage, rich-lean burning step.

17. A method in accordance with claim 16 wherein at least a part of the off gas is burned in the fuel-lean stage of the two-stage, rich-lean burning step.

18. A method in accordance with claim 1 wherein a normally gaseous off gas is separated from the effluent of the step of contacting the primary fuel to remove $SO_x$ precursors, said off gas is treated to remove a hydrogen-rich portion and said hydrogen-rich portion is recycled to said step of contacting the primary fuel to remove $SO_x$ precursors.

19. A method in accordance with claim 1 wherein the step of contacting the primary fuel to remove $SO_x$ precursors is carried out in the presence of water supplied by at least one of the steps of adding water to the step of burning the auxiliary fuel, utilizing water to terminate the step of burning the auxiliary fuel, adding water to the effluent from the step of burning the auxiliary fuel and adding water to the step of contacting the primary fuel to remove $SO_x$ precursors from the fuel.

20. A method for minimizing the production of $SO_x$ and $NO_x$ in the burning of a primary fuel containing significant amounts of $SO_x$ and $NO_x$ precursors, comprising:
 (a) burning an auxiliary fuel in the presence of a combustion supporting material to produce an auxiliary fuel effluent;
 (b) contacting said primary fuel with said auxiliary fuel effluent in the presence of water, produced by at least one of the steps of adding water during the step of burning the auxiliary fuel, utilizing water to terminate the step of burning the auxiliary fuel, adding water to the effluent from the step of burning the auxiliary fuel and adding water to said step of contacting said primary fuel with said auxiliary fuel effluent, under conditions sufficient to remove significant amounts of $SO_x$ precursors from said primary fuel but insufficient to remove significant amounts of said $NO_x$ precursors from said primary fuel, to produce a primary fuel containing significant amounts of $NO_x$ precursors and reduced amounts of $SO_x$ precursors;
 (c) carrying out fuel-rich combustion by burning the thus contacted primary fuel in a combustion zone in the presence of a combustion supporting material, sufficient to supply oxygen in an amount less than the stoichiometric amount necessary to burn all of said primary fuel, and for a residence time sufficient to convert a major portion of said $NO_x$ precursors to $N_2$, to produce an effluent containing significant amounts of $N_2$ and unburned and partially burned fuel;
 (d) abruptly terminating said fuel-rich combustion and initiating fuel-lean combustion; and
 (e) carrying out fuel-lean combustion of said effluent containing significant amounts of unburned and partially burned fuel by burning said effluent in the presence of an additional amount of combustion supporting material, sufficient to supply oxygen in an amount sufficient to provide an overall amount of oxygen at least as great as the stoichiometric amount necessary to burn all of said primary fuel, and for a residence time sufficient to essentially complete the combustion of said primary fuel, to produce a flue gas predominating in $N_2$ and $CO_2$ and containing substantially reduced amounts of $SO_x$ and $NO_x$.

21. A method in accordance with claim 20 wherein the step of contacting the primary fuel to remove $SO_x$ precursors is carried out in the presence of an alkaline material.

22. A method in accordance with claim 2 wherein the alkaline material is an alkaline carbonate.

23. A method in accordance with claim 22 wherein the alkaline material is sodium carbonate.

24. A method in accordance with claim 21 wherein the alkaline material is an alkaline material adapted to form carbonates by reaction with $CO_2$.

25. A method in accordance with claim 21 wherein the alkaline material comprises sodium hydroxide and calcium hydroxide.

26. A method for minimizing the production of $SO_x$ and $NO_x$ in the burning of a primary fuel containing significant amounts of $SO_x$ and $NO_x$ precursors, comprising:
 (a) burning an auxiliary fuel in the presence of a combustion supporting material to produce an auxiliary fuel effluent;
 (b) contacting said primary fuel with said auxiliary fuel effluent in the presence of an alkaline material;
 (c) carrying out fuel-rich combustion by burning the thus contacted primary fuel in a combustion zone in the presence of a combustion supporting material, sufficient to supply oxygen in an amount less than the stoichiometric amount necessary to burn all of said primary fuel, and for a residence time sufficient to convert a major portion of said $NO_x$ precursors to $N_2$, to produce an effluent containing significant amounts of $N_2$ and unburned and partially burned fuel;
 (d) abruptly terminating said fuel-rich combustion and initiating fuel-lean combustion; and (e) carrying out fuel-lean combustion of said effluent containing significant amounts of unburned and partially burned fuel by burning said effluent in the presence of an additional amount of combustion supporting material, sufficient to supply oxygen in an amount sufficient to provide an overall amount of oxygen at least as great as the stoichiometric amount necessary to burn all of said primary fuel, and for a residence time sufficient to essentially complete the combustion of said primary fuel, to produce a flue gas predominating in $N_2$ and $CO_2$ and containing substantially reduced amounts of $SO_x$ and $NO_x$.

27. A method in accordance with claim 26 wherein the alkaline material is an alkaline carbonate.

28. A method in accordance with claim 27 wherein the alkaline carbonate is sodium carbonate.

29. A method in accordance with claim 26 wherein the alkaline material is adapted to form carbonates by reaction with $CO_2$.

30. A method in accordance with claim 26 wherein the alkaline material comprises sodium hydroxide and calcium hydroxide.

31. A method in accordance with claim 26 wherein a normally gaseous off-gas is separated from the effluent of the step of contacting the primary fuel to remove $SO_x$ precursors and at least a part of said off-gas is burned in the step of burning the auxiliary fuel.

32. A method in accordance with claim 26 wherein a normally gaseous off-gas is separated from the effluent of the step of contacting the primary fuel to remove $SO_x$ precursors, the step of burning the auxiliary fuel is a two-stage, rich-lean burning step and at least a part of said off-gas is burned in said two-stage, rich-lean burning step.

33. A method in accordance with claim 32 wherein at least a part of the off gas is burned in the fuel-lean stage of the two-stage, rich-lean burning step.

* * * * *

UNITED STATES PATENT AND TRADEMARK OFFICE
CERTIFICATE OF CORRECTION

PATENT NO. : 4,488,866
DATED : December 18, 1984
INVENTOR(S) : Robert M. Schirmer and Henry E. Alquist It is certified that error appears in the above—identified patent and that said Letters Patent are hereby corrected as shown below:

Column 34, Claim 3, line 39, after "contacting" and before "primary",
    insert --- the ---
Column 36, Claim 22, line 38, delete "2" and insert --- 21---

Signed and Sealed this

First Day of October 1985

[SEAL]

*Attest:*

*Attesting Officer*

DONALD J. QUIGG

*Commissioner of Patents and Trademarks—Designate*